United States Patent
Kawamoto et al.

(10) Patent No.: US 10,870,047 B1
(45) Date of Patent: Dec. 22, 2020

(54) INFORMATION PROCESSING SYSTEM, INFORMATION PROCESSING APPARATUS, STORAGE MEDIUM HAVING INFORMATION PROCESSING PROGRAM STORED THEREIN, AND INFORMATION PROCESSING METHOD

(71) Applicant: NINTENDO CO., LTD., Kyoto (JP)

(72) Inventors: Koichi Kawamoto, Kyoto (JP); Masaki Wada, Kyoto (JP); Hiroshi Matsunaga, Kyoto (JP); Yuji Sawatani, Kyoto (JP); Atsushi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/745,884

(22) Filed: Jan. 17, 2020

(30) Foreign Application Priority Data

Jul. 22, 2019 (JP) .................................. 2019-134652

(51) Int. Cl.
*G09B 19/00* (2006.01)
*A63B 71/06* (2006.01)
(Continued)

(52) U.S. Cl.
CPC ........ *A63B 71/0622* (2013.01); *A63B 21/028* (2013.01); *A63B 24/0062* (2013.01);
(Continued)

(58) Field of Classification Search
CPC .. G09B 19/00; G09B 19/003; G09B 19/0038; A63H 19/00; A63H 21/02
See application file for complete search history.

(56) References Cited

U.S. PATENT DOCUMENTS 5,072,927 A * 12/1991 Santos ................. A63B 21/045
   482/8
5,342,273 A *  8/1994 Plendl .................... A63B 19/00
   482/122
(Continued)

FOREIGN PATENT DOCUMENTS

| JP | S63-234991  | 9/1988 |
| JP | 2010-211379 | 9/2010 |
| WO | 2016/059943 | 4/2016 |

OTHER PUBLICATIONS

Office Action for JP2019-134652, dispatched Dec. 18, 2019, 4 pages.

*Primary Examiner* — Kurt Fernstrom
(74) *Attorney, Agent, or Firm* — Nixon & Vanderhye PC

(57) ABSTRACT

An example of a training tool includes a first sensor. The training tool deforms from a stationary state when a force is externally applied thereto. The first sensor output according to deformation of the training tool. A processor receives first sensor information based on an output of the first sensor. While a menu is presented, the processor executes a process according to a first instruction performed on the menu, in a case where the received first sensor information indicates an output obtained when the training tool deforms in a first direction, and executes a process according to a second instruction that is performed on the menu and is different from the first instruction, in a case where the received first sensor information indicates an output obtained when the training tool deforms in a second direction opposite to the first direction.

21 Claims, 18 Drawing Sheets

(51) Int. Cl.
  *A63B 24/00* (2006.01)
  *A63B 21/02* (2006.01)
(52) U.S. Cl.
  CPC .... *G09B 19/003* (2013.01); *A63B 2071/0694* (2013.01); *A63B 2220/40* (2013.01); *A63B 2220/833* (2013.01)

(56) References Cited

U.S. PATENT DOCUMENTS

| | | | |
|---|---|---|---|
| 5,735,781 A * | 4/1998 | Pai | A63B 21/05 |
| | | | 482/122 |
| D462,098 S * | 8/2002 | Fazeli | D21/456 |
| 6,733,427 B1 * | 5/2004 | He | A63B 21/0004 |
| | | | 482/121 |
| 6,932,747 B2 * | 8/2005 | Herman | A63B 21/026 |
| | | | 482/121 |
| 7,335,134 B1 * | 2/2008 | LaVelle | A63B 23/0211 |
| | | | 482/1 |
| 10,471,303 B2 * | 11/2019 | Kuroda | A63B 24/0087 |
| 10,688,387 B2 * | 6/2020 | Croft | G06F 3/0338 |
| 10,691,233 B2 * | 6/2020 | Dalton | A63F 13/44 |
| 10,786,698 B2 * | 9/2020 | Endemann | A63B 21/026 |
| 2007/0287617 A1 * | 12/2007 | Teng | A63B 21/4043 |
| | | | 482/126 |
| 2008/0146336 A1 * | 6/2008 | Feldman | A63F 13/02 |
| | | | 463/37 |
| 2010/0004061 A1 * | 1/2010 | Merril | A63B 24/0087 |
| | | | 463/36 |
| 2010/0224420 A1 | 9/2010 | Miyanaga | |
| 2012/0010056 A1 * | 1/2012 | Chang | A63B 23/03508 |
| | | | 482/122 |
| 2013/0157817 A1 * | 6/2013 | Green | A63B 23/1209 |
| | | | 482/122 |
| 2015/0031456 A1 * | 1/2015 | Dascher | A63F 13/24 |
| | | | 463/38 |
| 2015/0081057 A1 * | 3/2015 | Hamada | A63B 21/0726 |
| | | | 700/91 |
| 2017/0216670 A1 | 8/2017 | Kuroda et al. | |
| 2018/0099218 A1 * | 4/2018 | Ikuta | A63F 13/24 |
| 2018/0193732 A1 * | 7/2018 | Kamata | A63F 13/428 |
| 2019/0159714 A1 * | 5/2019 | Nagasu | A61B 5/225 |

* cited by examiner

US 10,870,047 B1

INFORMATION PROCESSING SYSTEM, INFORMATION PROCESSING APPARATUS, STORAGE MEDIUM HAVING INFORMATION PROCESSING PROGRAM STORED THEREIN, AND INFORMATION PROCESSING METHOD

CROSS REFERENCE TO RELATED APPLICATION

The disclosures of Japanese Patent Application No. 2019-134652, filed on Jul. 22, 2019, are incorporated herein by reference.

FIELD

The technique shown here relates to: an information processing system including a training tool; and an information processing apparatus, a storage medium having an information processing program stored therein, and an information processing method which are used in the information processing system.

BACKGROUND AND SUMMARY

Conventionally, a system that enables a user to perform training with a training tool has been known. In this system, the training tool is connected to a mobile terminal through wireless communication, and the user operates the mobile terminal to start up a training program.

In the conventional system, since the user performs operations such as start-up of the training program with the mobile terminal, it is bothersome for the user, who is using the training tool, to switch the training tool for the mobile terminal as appropriate. Thus, there is a room for improvement in terms of convenience of the user.

Therefore, the present application discloses an information processing system, an information processing apparatus, a storage medium having an information processing program stored therein, and an information processing method which are capable of improving convenience of a user in using a training tool.

(1)

An example of an information processing system described in the present specification includes a training tool which includes a first sensor and is configured to be held by a user, and a processor integral with or separate from the training tool. The training tool is configured to be in a stationary state when no force is externally applied thereto, and deform from the stationary state when a force is externally applied thereto. The first sensor is configured to perform an output according to deformation of the training tool. The processor is configured to (1) receive first sensor information based on the output of the first sensor, (2) present a menu that accepts an instruction performed by the user, and (3) while the menu is presented, execute a process according to a first instruction performed on the menu, in a case where the received first sensor information indicates an output obtained when the training tool deforms in a first direction, and execute a process according to a second instruction that is an instruction performed on the menu and is different from the first instruction, in a case where the received first sensor information indicates an output obtained when the training tool deforms in a second direction opposite to the first direction.

According to the configuration of above (1), since the user can perform an instruction on the menu while holding the training tool (e.g., without switching the training tool for another device), convenience of the user in using the training tool can be improved.

(2)

The training tool may include two grip portions to be held by hands of the user. The first direction is a direction in which the two grip portions approach each other. The second direction is a direction in which the two grip portions are away from each other.

(3)

When the training tool deforms in the first direction, the output of the first sensor may be increased as compared to the output when the training tool is in the stationary state. When the training tool deforms in the second direction, the output of the first sensor may be decreased as compared to the output when the training tool is in the stationary state.

(4)

The first direction may be a direction in which a first portion and a second portion of the training tool approach each other. The first portion is on an opposite side to the second portion with respect to a predetermined portion of the training tool. The second direction may be a direction in which the first portion and the second portion are away from each other.

According to the configuration of any of above (2) to (4), the user can easily perform the two types of instructions through the operation to deform the training tool.

(5)

The training tool may include two grip portions to be held by hands of the user. The training tool may include an operation device configured to accept an operation different from an operation to deform the training tool. The one or more processors may be configured to: receive operation information based on an output of the operation device; execute a process according to the first instruction performed on the menu, in a case where the received operation information indicates an output obtained when a first operation has been performed to the operation device; and execute a process according to the second instruction performed on the menu, in a case where the received operation information indicates an output obtained when a second operation different from the first operation has been performed to the operation device. The operation device may be in an area that is not or less likely to be reached by the hands of the user when the user is holding the two grip portions of the training tool in the stationary state.

According to the configuration of above (5), since the user can perform an instruction on the menu by the two types of methods, convenience of the user in terms of menu operation can be improved.

(6)

The area may be at a distance of 7 cm or more from each of the two grip portions.

(7)

The training tool may have a shape of a circular ring. The training tool may include an attachment member to which a controller is attachable. The controller may include an operation device configured to accept an operation different from an operation to deform the training tool. The one or more processors may be configured to: receive operation information based on an output of the operation device; execute a process according to the first instruction performed on the menu, in a case where the received operation information indicates an output obtained when a first operation has been performed to the operation device; and execute a process according to the second instruction performed on the menu, in a case where the received operation information indicates an output obtained when a second operation different from the first operation has been performed to the operation device. The circular ring may be formed such that the operation device included in the controller attached to the attachment member is in an area that is not or less likely to be reached by hands of the user when the user is holding a first portion with one hand and holding a second portion with the other hand, wherein the first portion and the second portion are two portions at which the circular ring intersects with a straight line which is orthogonal to a straight line connecting a center of the attachment member and a center of the circular ring of the training tool at the center of the circular ring.

According to the configuration of above (7), like the configuration of above (5), since the user can perform an instruction on the menu by the two types of methods, convenience of the user in terms of menu operation can be improved.

(8)

The area may be located at a distance of 7 cm or more from each of the first portion and the second portion.

(9)

In a state where an instruction caused by an operation to deform the training tool has been previously accepted during presentation of the menu, if operation information is received while the menu is presented, the operation information indicating an output obtained when an operation corresponding to an instruction on the menu has been performed to the operation device, the one or more processors may execute a process according to the instruction caused by the operation to the operation device. In a state where an instruction caused by an operation to the operation device has been previously accepted during presentation of the menu, if first sensor information is received first, the first sensor information indicating an output obtained when an operation corresponding to an instruction on the menu has been performed to deform the training tool, the one or more processors may not execute a process according to the instruction caused by the operation, and if the first sensor information indicating the output is further received, the one or more processors may execute the process according to the instruction caused by the operation.

According to the configuration of above (9), since no process is executed with respect to the first operation to deform the training tool, the likelihood of execution of a process against the intention of the user can be reduced.

(10)

The information processing system may include a display device. The one or more processors may be configured to: cause the display device to selectively display one of a first guide image representing an operation to deform the training tool and a second guide image representing an operation to the operation device; cause the display device to display the first guide image, in a case where the first sensor information received while the menu is presented indicates that an operation corresponding to an instruction on the menu has been performed to deform the training tool; and cause the display device to display the second guide image, in a case where the operation information received while the menu is presented indicates that an operation corresponding to an instruction on the menu has been performed to the operation device.

According to the configuration of above (10), a guide image considered to be useful for the user can be presented while saving the space for displaying the guide image.

(11)

The one or more processors may be configured to execute, as the process according to the second instruction, a process of restoring a result of the process executed according to the first instruction.

According to the configuration of above (11), an operation method that the user can easily and intuitively understand can be provided.

(12)

The information processing system may further comprise a second sensor configured to detect a motion of the training tool. The menu may include a plurality of items each being selectable by the user. The one or more processors may be configured to receive second sensor information based on an output of the second sensor, and execute a process of selecting one item from among the plurality of items, based on the received second sensor information.

According to the configuration of above (12), since the user can perform more instructions by using the training tool, usability of the training tool can be improved.

(13)

The second sensor may be an acceleration sensor. The one or more processors may be configured to change an item in a state being selected among the plurality of items, in response to an operation of rotating the training tool about an axis not parallel to a direction of gravity.

According to the configuration of above (13), the operation or rotating the training tool can be accurately detected based on the output of the acceleration sensor.

(14)

A process on an item being selected among the plurality of items may be executed according to the first instruction. The one or more processors may be configured not to execute the process based on the output of the second sensor or configured to reduce responsivity of the process as compared to that in the case where the training tool is in the stationary state, during a predetermined period included in a period in which the training tool is being deformed in the first direction.

According to the configuration of above (14), it is possible to reduce the likelihood that an operation not intended by the user is detected during the predetermined period and thereby a process not intended by the user is executed.

(15)

In a case where the training tool deforms in the first direction from the stationary state, the one or more processors may execute a process instructed by the first instruction, in response to deformation of the training tool to an extent equal to or more than a first deformation state in which the training tool has deformed in the first direction from the stationary state. In a case where the training tool deforms to an extent equal to or more than the first deformation state, then starts to return toward the stationary state, and thereafter deforms in the first direction without returning to the stationary state, the one or more processors may execute the process instructed by the first instruction, in response to deformation of the training tool to an extent equal to or more than a second deformation state in which an amount of deformation in the first direction is more than that in the first deformation state.

According to the configuration of above (15), when the operation to deform the training tool in the first direction is successively performed, operability of this operation can be improved.

(16)

In a case where the training tool deforms to an extent equal to or more than the first deformation state, then returns to a state of deformation equal to or less than a third deformation state in which an amount of deformation in the first direction is less than that in the first deformation state, and thereafter deforms in the first direction, the one or more processors may execute the process instructed by the first instruction, in response to deformation of the training tool to an extent equal to or more than the second deformation state. In a case where the training tool deforms to an extent equal to or more than the first deformation state, then returns toward the stationary state without having returned to the third deformation state, and thereafter deforms in the first direction, the one or more processors may not execute the process instructed by the first instruction even if the training tool deforms to an extent equal to or more than the second deformation state.

According to the configuration of above (16), it is possible to reduce the likelihood that a second operation to deform the training tool in the first direction is detected against the intention of the user.

This specification discloses an information processing apparatus including the processor described in above (1) to (16), a storage medium having stored therein an information processing program for executing the processes by the processor described in above (1) to (16), and an information processing method to be executed in the information processing system described in above (1) to (16).

According to the information processing system, the information processing apparatus, the storage medium, and the information processing method described above, convenience of the user in using the training tool can be improved.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

Figure 1:
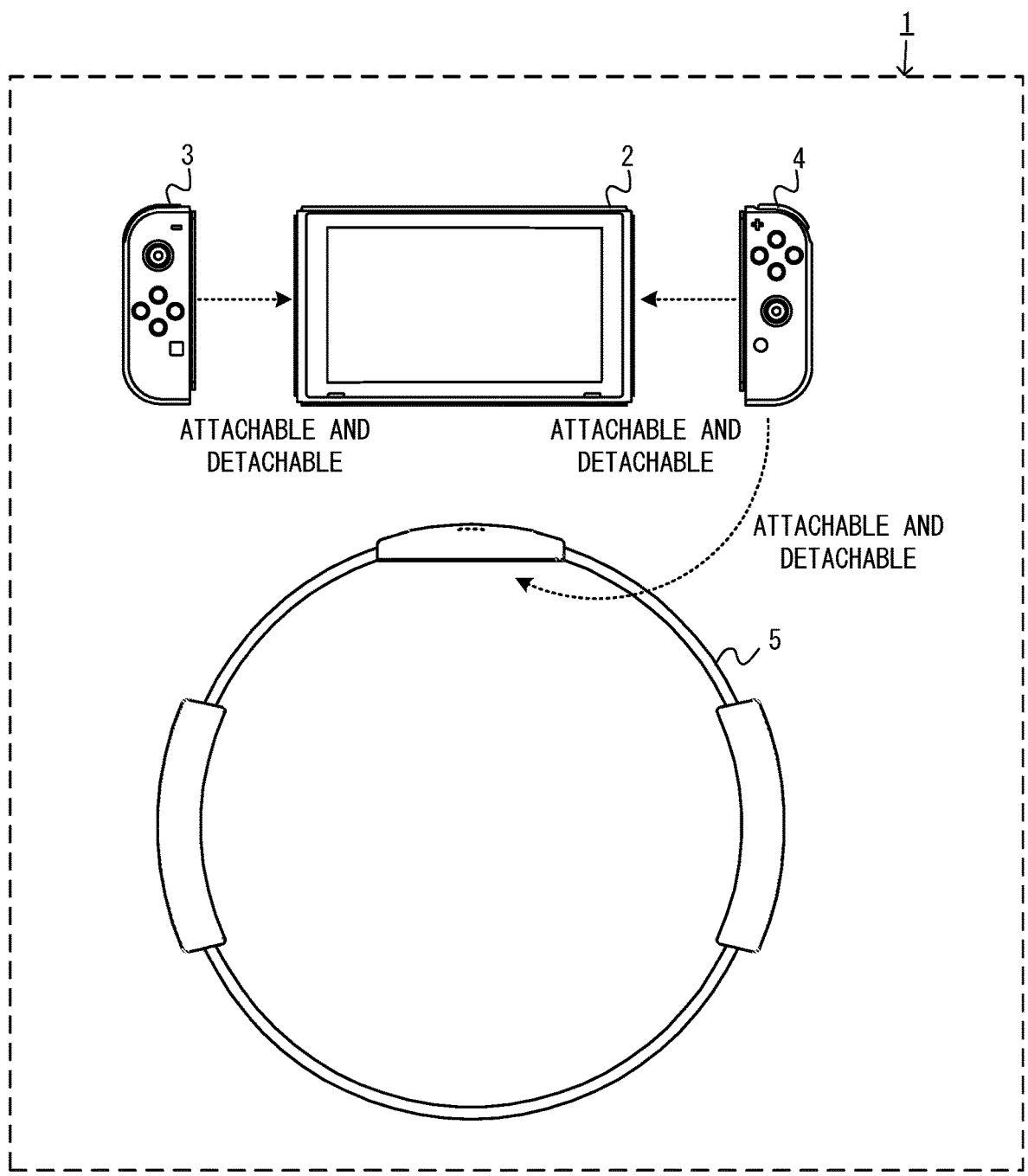
FIG. 1 is a diagram showing an example of a non-limiting apparatuses included in a game system.

A game system according to an example of an exemplary embodiment is described below. FIG. 1 is a diagram showing an example of devices included in the game system. As shown in FIG. 1, the game system 1 includes a main body apparatus 2, a left controller 3, a right controller 4, and a ring-shaped extension apparatus 5.

The main body apparatus 2 is an example of an information processing apparatus, and functions as a game apparatus main body in this embodiment. The left controller 3 and the right controller 4 are attachable to and detachable from the main body apparatus 2 (see FIG. 1 and FIG. 3). That is, a user can attach each of the left controller 3 and the right controller 4 to the main body apparatus 2 to use the apparatus 2 and the controllers 3 and 4 as a unified apparatus (refer to FIG. 2). Alternatively, the user also can use the main body apparatus 2, the left controller 3, and the right controller 4 as separate bodies (see FIG. 3). Hereinafter, the main body apparatus 2 and the controllers 3 and 4 may be collectively referred to as a "game apparatus".

The ring-shaped extension apparatus 5 is an example of an extension apparatus used for the right controller 4. The ring-shaped extension apparatus 5 is used in the state where the right controller 4 is attached thereto. Thus, in the present embodiment, the user can also use the right controller 4 in the state of being attached to the ring-shaped extension apparatus 5 (see FIG. 10). To the ring-shaped extension apparatus 5, not only the right controller 4 but also the left controller 3 may be attached.

[1-1. Configuration of Game Apparatus]

Figure 2:
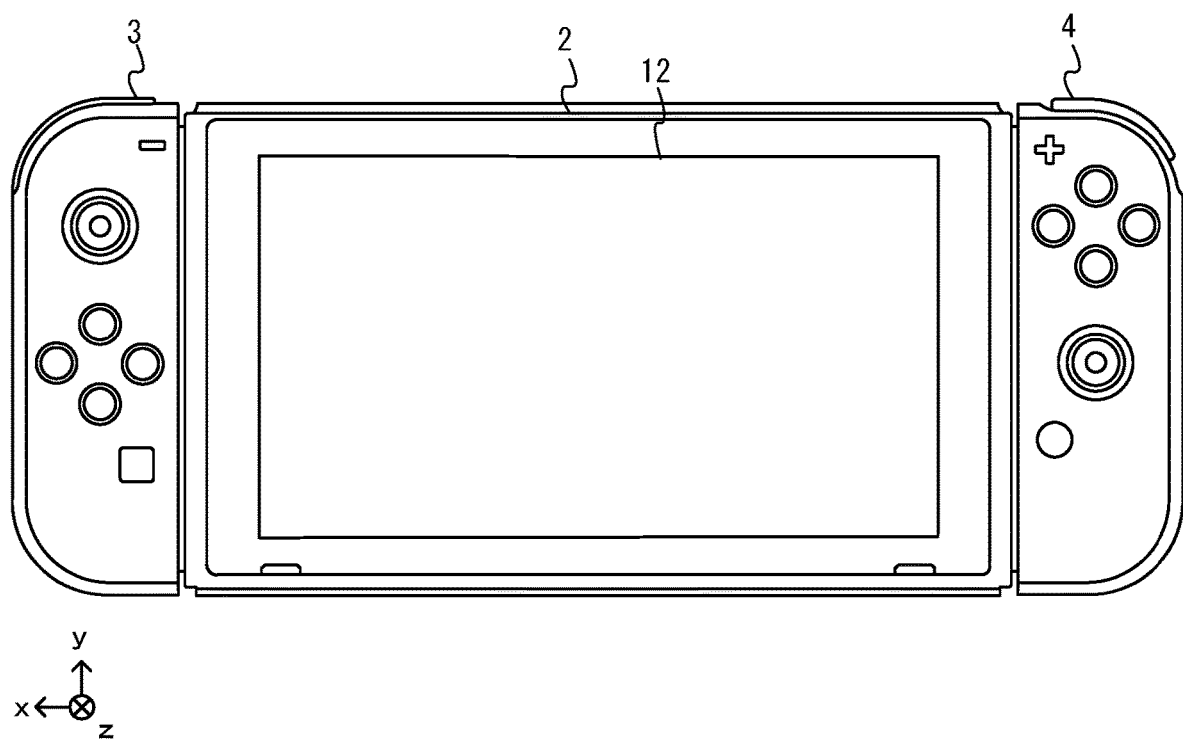
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
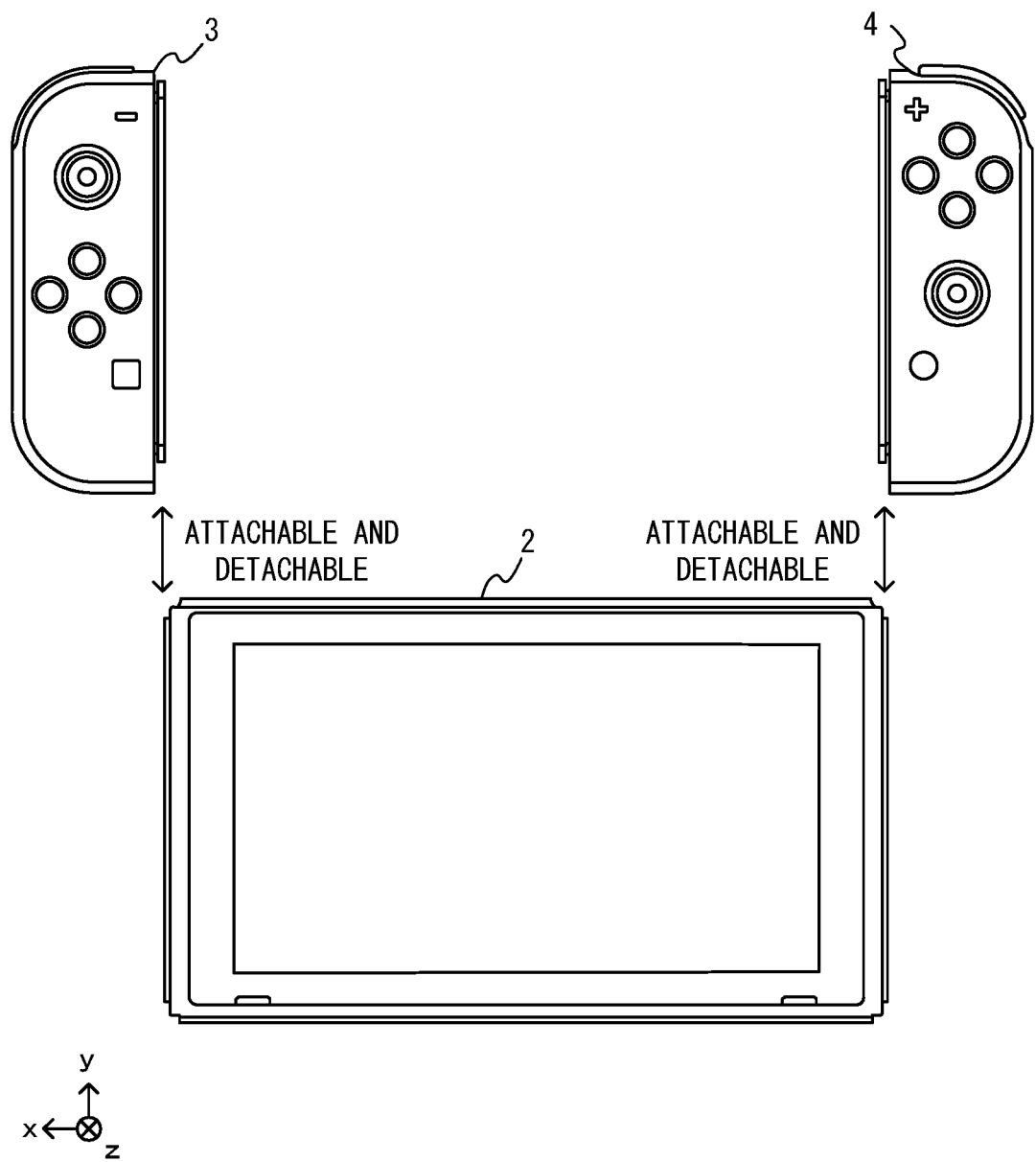
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
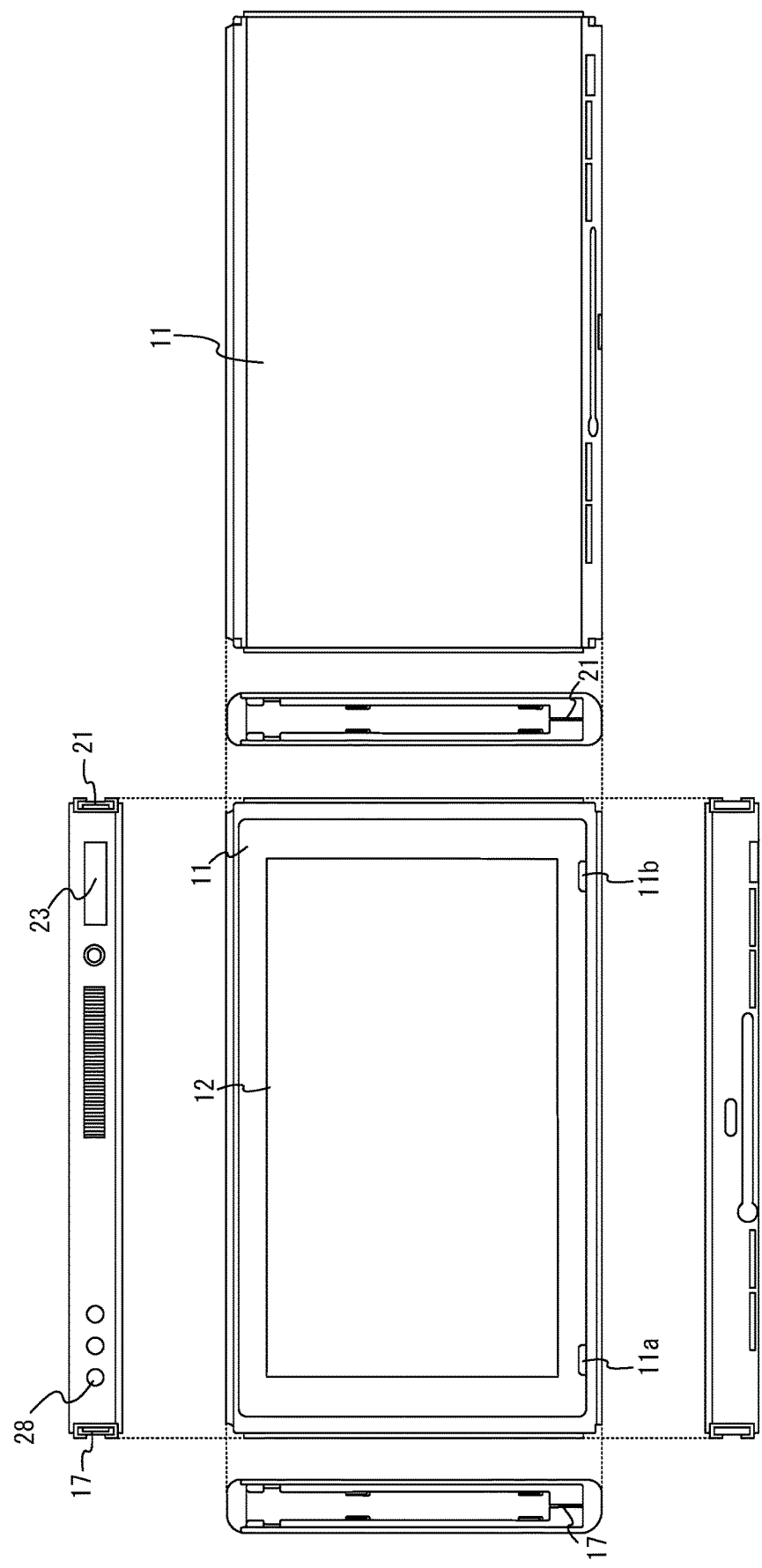
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type. The main body apparatus 2 can also output the image to an external monitor.

The main body apparatus 2 includes speakers within the housing 11. As shown in FIG. 4, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 5:
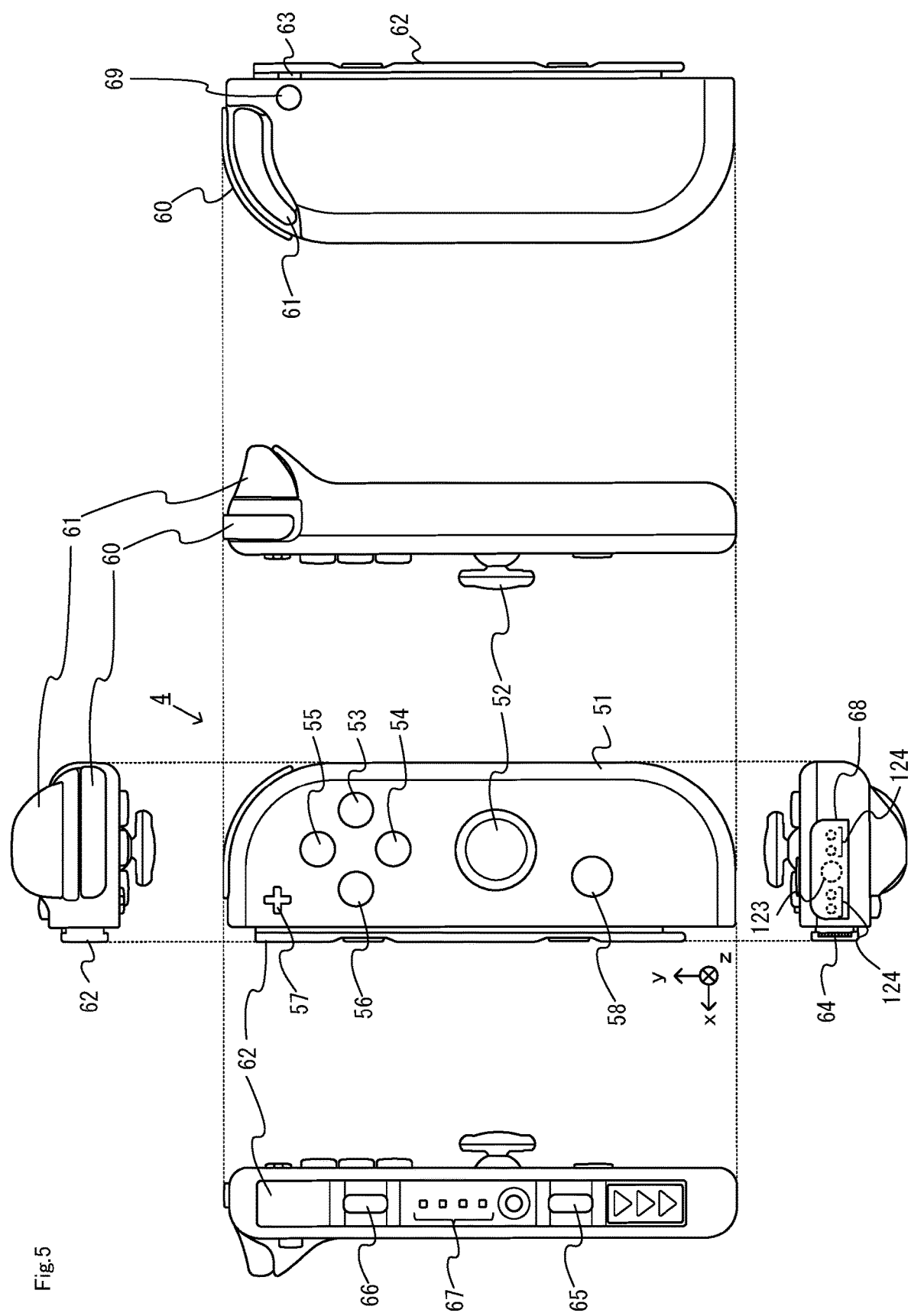
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in an up-down direction (i.e., a y-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the left hand. Further, the right controller 4 can also be held in the orientation in which the right controller 4 is horizontally long. When held in the orientation in which the right controller 4 is horizontally long, the right controller 4 may be held with both hands.

The right controller 4 includes an analog stick 52 as a direction input section. As shown in FIG. 5, the analog stick 52 is provided on a main surface of the housing 51. The user tilts the analog stick 52 and thereby can input a direction corresponding to the direction of the tilt (and input a magnitude corresponding to the angle of the tilt). It should be noted that the right controller 4 may include a directional pad, a slide stick that allows a slide input, or the like, instead of the analog stick. Further, in the exemplary embodiment, it is possible to provide an input by pressing the analog stick 52.

The right controller 4 includes various operation buttons. The right controller 4 includes four operation buttons 53 to 56 (specifically, an A-button 53, a B-button 54, an X-button 55, and a Y-button 56) on the main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, the right controller 4 includes a second L-button 65 and a second R-button 66, on the side surface of the housing 31 on which the right controller 4 is attached to the main body apparatus 2. These operation buttons are used to give instructions depending on various programs (e.g., an OS program and an application program) executed by the main body apparatus 2.

Further, the right controller 4 includes a terminal 64 for the right controller 4 to perform wired communication with the main body apparatus 2.

Like the right controller 4, the left controller 3 includes an analog stick and a plurality of operation buttons. Further, like the right controller 4, the left controller 3 includes a terminal for the main body apparatus 2 to perform wired communication with the left controller 3.

Figure 6:
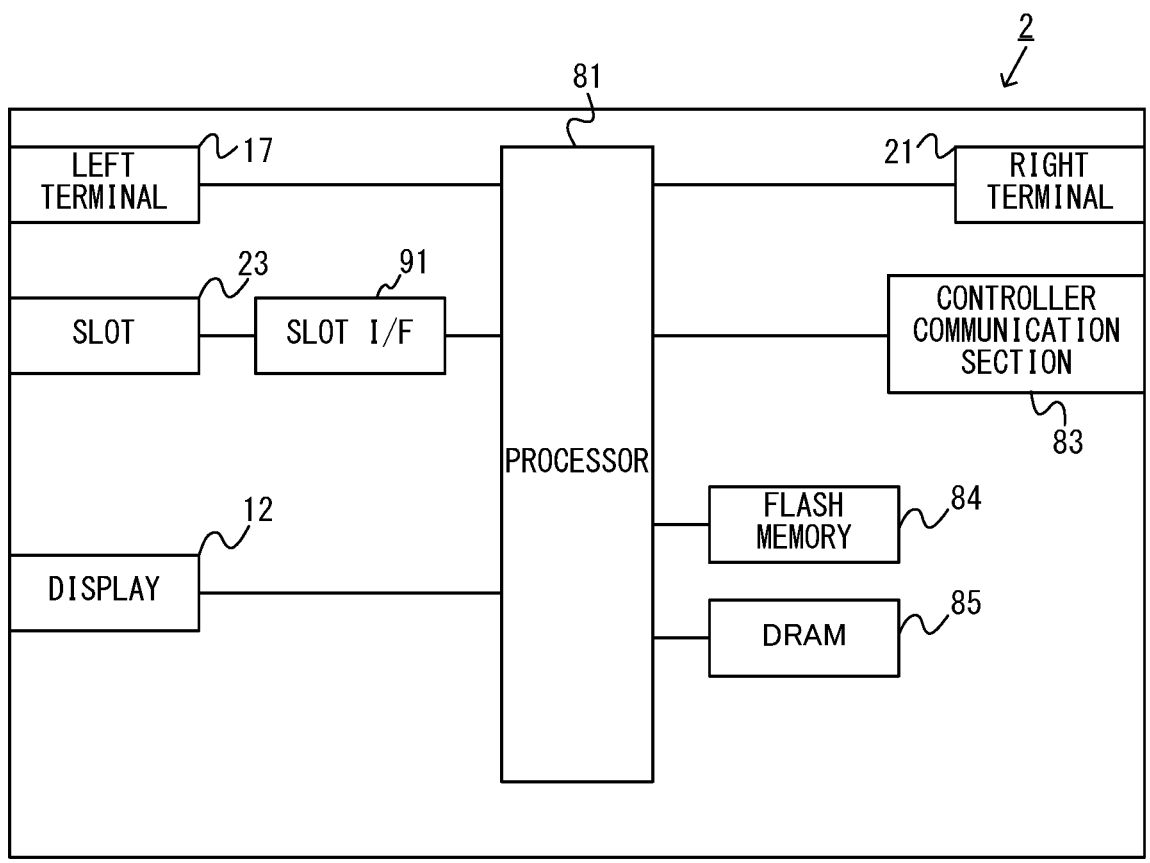
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Further, the display 12 is connected to the processor 81. The processor 81 displays a generated image (e.g., an image generated by executing the above information processing) and/or an externally acquired image on the display 12.

Figure 7:
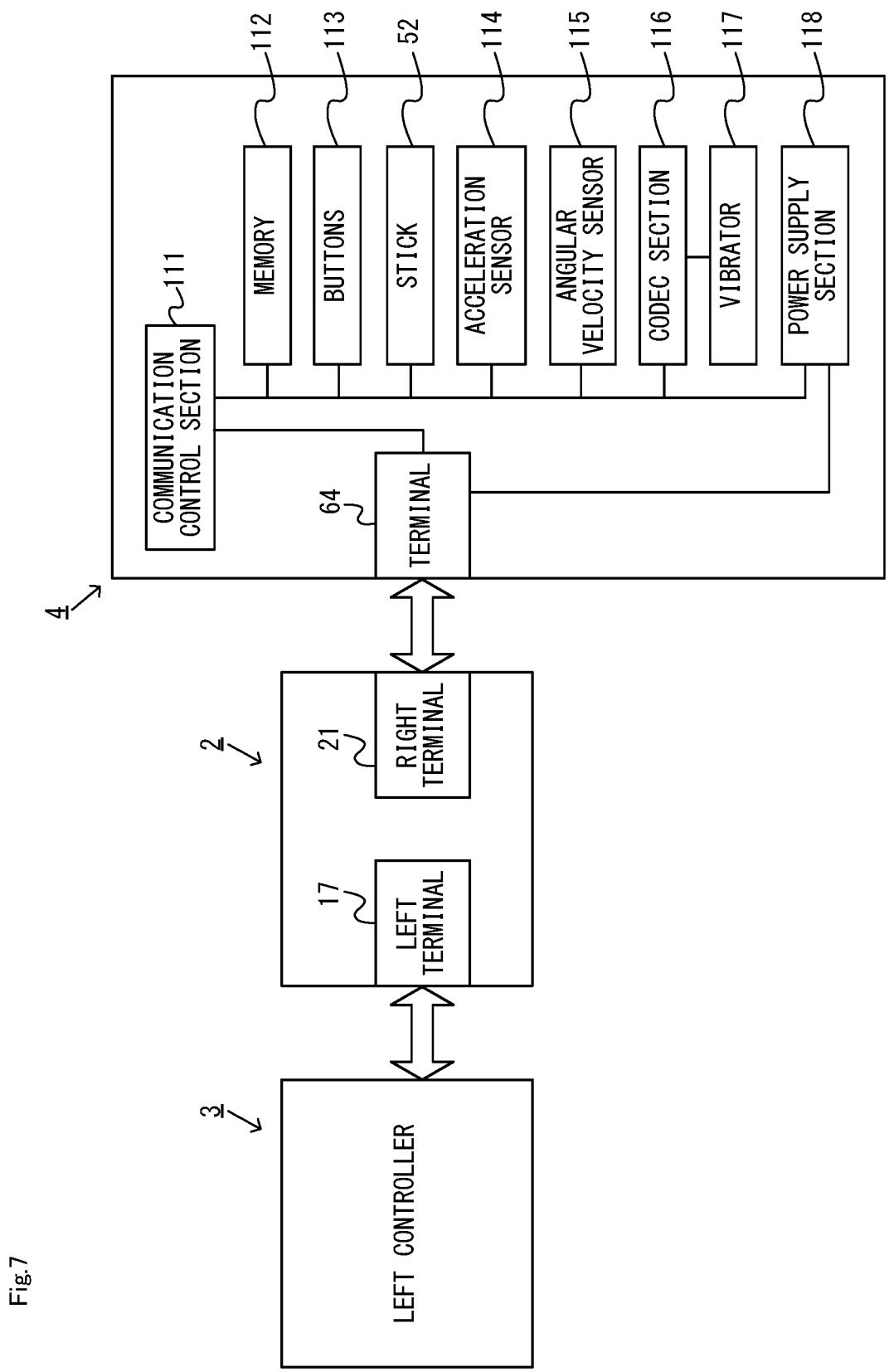
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The right controller 4 includes a communication control section 111, which communicates with the main body apparatus 2. As shown in FIG. 7, the communication control section 111 is connected to components including the terminal 64. In the exemplary embodiment, the communication control section 111 can communicate with the main body apparatus 2 through both wired communication via the terminal 64 and wireless communication not via the terminal 64. The communication control section 111 controls the method for communication performed by the right controller 4 with the main body apparatus 2. That is, when the right controller 4 is attached to the main body apparatus 2, the communication control section 111 communicates with the main body apparatus 2 via the terminal 64. Further, when the right controller 4 is detached from the main body apparatus 2, the communication control section 111 wirelessly communicates with the main body apparatus 2 (specifically, the controller communication section 83). The wireless communication between the communication control section 111 and the controller communication section 83 is performed in accordance with the Bluetooth (registered trademark) standard, for example.

Further, the right controller 4 includes a memory 112 such as a flash memory. The communication control section 111 includes, for example, a microcomputer (or a microprocessor) and executes firmware stored in the memory 112, thereby performing various processes.

The right controller 4 includes buttons 113 (specifically, the buttons 53 to 58, 60, 61, 65, and 66). Further, the right controller 4 includes the analog stick ("stick" in FIG. 7) 52. Each of the buttons 113 and the analog stick 52 outputs information regarding an operation performed on itself to the communication control section 111 repeatedly at appropriate timing.

The right controller 4 includes inertial sensors. Specifically, the right controller 4 includes an acceleration sensor 114. Further, the right controller 4 includes an angular velocity sensor 115. In the exemplary embodiment, the acceleration sensor 114 detects the magnitudes of accelerations along predetermined three axial (e.g., xyz axes shown in FIG. 5) directions. It should be noted that the acceleration sensor 114 may detect an acceleration along one axial direction or accelerations along two axial directions. In the exemplary embodiment, the angular velocity sensor 115 detects angular velocities about predetermined three axes (e.g., the xyz axes shown in FIG. 5). It should be noted that the angular velocity sensor 115 may detect an angular velocity about one axis or angular velocities about two axes. Each of the acceleration sensor 114 and the angular velocity sensor 115 is connected to the communication control section 111. Then, the detection results of the acceleration sensor 114 and the angular velocity sensor 115 are output to the communication control section 111 repeatedly at appropriate timing.

The communication control section 111 acquires information regarding an input (specifically, information regarding an operation or the detection result of the sensor) from each of input sections (specifically, the buttons 113, the analog stick 52, and the sensors 114 and 115). The communication control section 111 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the right controller 4. That is, the main body apparatus 2 can determine operations on the buttons 113 and the analog stick 52 based on the operation data. Further, the main body apparatus 2 can calculate information regarding the motion and/or the orientation of the right controller 4 based on the operation data (specifically, the detection results of the acceleration sensor 114 and the angular velocity sensor 115).

The right controller 4 includes a vibrator 117 for giving notification to the user by a vibration. In the exemplary embodiment, the vibrator 117 is controlled by a command from the main body apparatus 2. That is, if receiving the above command from the main body apparatus 2, the communication control section 111 drives the vibrator 117 in accordance with the received command. Here, the right controller 4 includes a codec section 116. If receiving the above command, the communication control section 111 outputs a control signal corresponding to the command to the codec section 116. The codec section 116 generates a driving signal for driving the vibrator 117 from the control signal from the communication control section 111 and outputs the driving signal to the vibrator 117. Consequently, the vibrator 117 operates.

The right controller 4 includes a power supply section 118. In the exemplary embodiment, the power supply section 118 includes a battery and a power control circuit. Although not shown in FIG. 7, the power control circuit is connected to the battery and also connected to components of the right controller 4 (specifically, components that receive power supplied from the battery).

Although not shown in the figures, the left controller 3 has the same components as those of the right controller 4 shown in FIG. 7.

[1-2. Configuration of Ring-Shaped Extension Apparatus]

Figure 8:
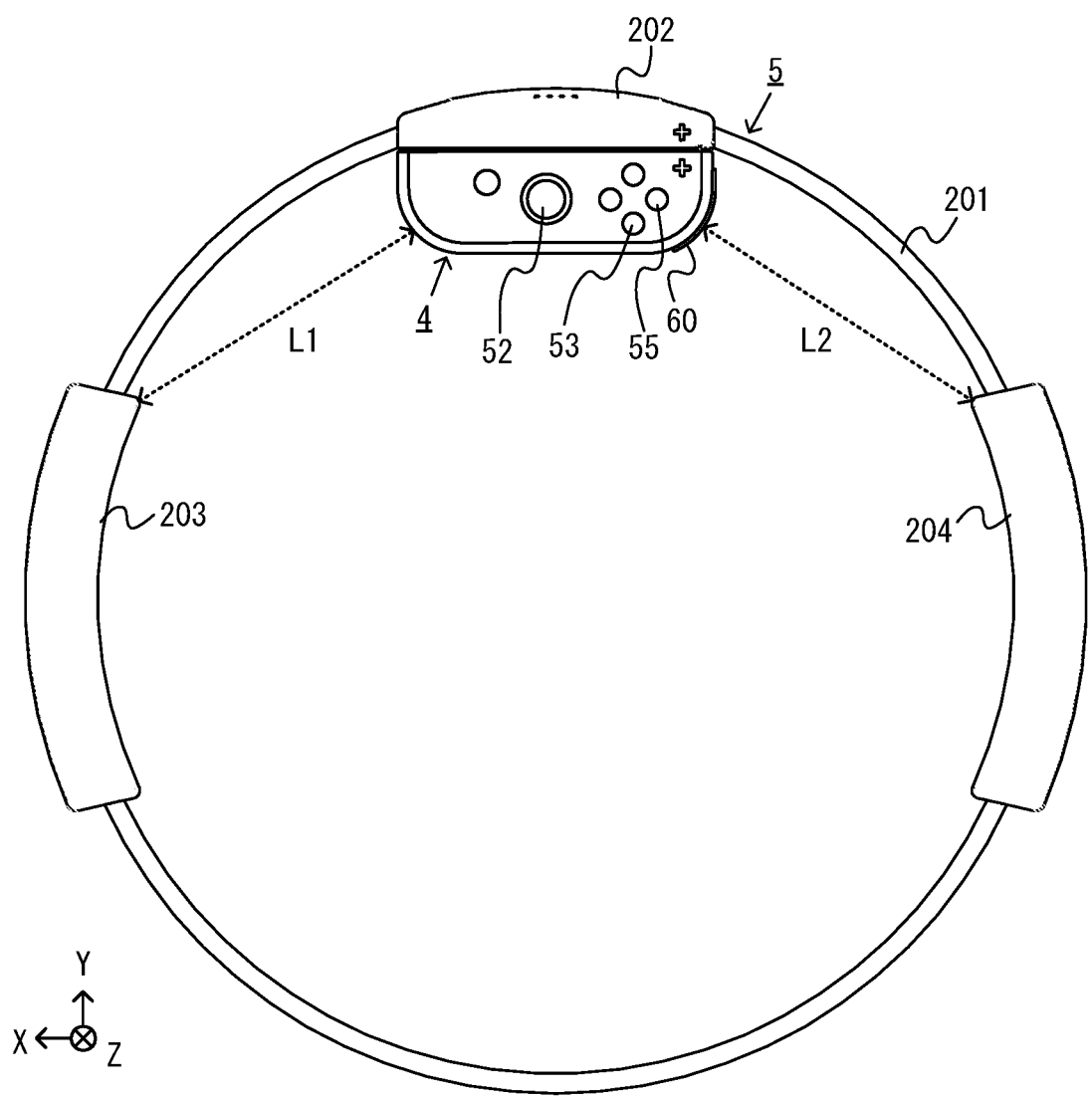
FIG. 8 is a diagram showing an example of a non-limiting ring-shaped extension apparatus 5.

FIG. 8 is a diagram showing an example of a ring-shaped extension apparatus.

Note that FIG. 8 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 8, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 5). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the direction parallel to the direction (referred to as the "front view direction") in which the ring formed by the ring-shaped portion 201 is viewed from front is the front-rear direction of the ring-shaped extension apparatus 5 (i.e., the Z-axis direction shown in FIG. 8). For example, "the direction in which the ring is viewed from front" is the direction from which the area of the shape represented by the outer edge of the ring appears largest. Where the ring is a circular ring, the "front view direction" can also be said to be the direction from which the ring appears circular.

The rail portion is provided on one side in the front-rear direction relative to the ring-shaped portion 201. Note that in the present embodiment, this side is denoted as the front side (in other words, the front near side) of the ring-shaped extension apparatus 5, and the opposite side thereto is denoted as the rear side (in other words, the back side) of the ring-shaped extension apparatus 5.

In the present embodiment, the right controller 4 includes a latch portion 63 (see FIG. 5). The latch portion 63 is provided so as to protrude sideways (i.e., the z-axis positive direction shown in FIG. 5) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 5). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 8, the ring-shaped extension apparatus 5 includes grip covers 203 and 204. The grip covers 203 and 204 are components to be held by the user. In the present embodiment, with the provision of the grip covers 203 and 204, it is easier for the user to hold the ring-shaped extension apparatus 5. The details of the grip covers 203 and 204 will now be described.

As shown in FIG. 8, in the present embodiment, two grip covers 203 and 204 are provided on the ring-shaped portion 201. In the present embodiment, the grip covers 203 and 204 can be removed from the ring-shaped portion 201. It can be said that the grip covers 203 and 204 are the grip portions of the ring-shaped portion 201. Herein, a grip portion is a portion of the ring-shaped portion 201 to be held by the user. In the present embodiment, a portion of the ring-shaped portion 201 near the right end thereof and a portion of the ring-shaped portion 201 near the left end thereof are the grip portions. That is, it can be said that when the main portion 202 is located at the central angle of 0° with respect to the center of the ring-shaped portion 201, the grip portions are provided at the position around +90° and at the position around −90°. Hereinafter, the grip portion near the right end of the ring-shaped portion 201 will be referred to as the right grip portion, and the grip portion near the left end of the ring-shaped portion 201 will be referred to as the left grip portion. Although not shown in the figures, each grip portion is provided with an element that allows the grip cover 203 or 204 to be put on. Where the grip cover 203 or 204 is removable from the ring-shaped portion 201 as in the present embodiment, the portion where the portion that allows the grip cover 203 or 204 to be put on is provided can be said to be the grip portion.

Note that the grip portions may have any configuration such that the grip portions can be recognized distinguished from the other portions of the ring-shaped portion 201. For example, when portions of the ring-shaped portion 201 (specifically, a portion near the left end and a portion near the right end of the ring-shaped portion 201) are of a different color and/or a different pattern from the other portions, they can be said to be grip portions (as they serve to allow the user to realize that they are the portions to be held for performing operations). When portions of the ring-shaped portion 201 (specifically, a portion near the left end and a portion near the right end of the ring-shaped portion 201) are formed to be thicker than the other portions, they can be said to be grip portions (as they serve to allow the user to realize that they are the portions to be held for performing operations). For example, when similar members to the grip covers are non-removably secured to the ring-shaped portion 201, those members can be said to be grip portions. As described above, with the grip portions, the ring-shaped extension apparatus 5 allows the user to perform operations while holding appropriate positions thereof.

The ring-shaped portion 201 may have such a size that allows the user to hold a part on one side with the left hand, and hold, with the right hand, a part on the other side that is symmetrical with the one-side part with respect to the center of the ring. In the present embodiment, the diameter of the ring formed by the ring-shaped portion 201 is 30 [cm].

In the state where the right controller 4 is attached to the ring-shaped extension apparatus 5, the analog stick 52 and the operation buttons 53 to 58 and 60 on the right controller 4 are located in an area that is not (or less likely to be) reached by the hands (fingers) of the user when the user is holding the left grip portion and the right grip portion. The "area that is not (or less likely to be) reached by the hands of the user" is an area where the distance from one member (i.e., the analog stick 52 or the operation buttons 53 to 58 and 60) to the other member (i.e., the grip cover as the grip portion) is equal to or greater than 7 [cm].

In the present embodiment, a distance L1 from a lower left portion of the right controller 4 to an upper right portion of the left grip cover 203 is 10 [cm] (see FIG. 8). A distance L2 from a lower right portion (specifically, the first R-button 60) of the right controller 4 to an upper left portion of the right grip cover 204 is 10 [cm] (see FIG. 8). Therefore, in the present embodiment, it can be said that the analog stick 52 and the operation buttons 53 to 56 are provided in an area that is not reached by the hands of the user when the user is holding the two grip portions (in other words, the grip covers 203 and 204) of the ring-shaped extension apparatus 5 in the stationary state. In addition, the grip covers 203 and 204 are located as follows. That is, assuming that a straight line, which is orthogonal to a straight line connecting the center of the attachment portion (i.e., the rail portion) and the center of the circular ring of the ring-shaped extension apparatus 5 at the center of the circular ring, intersects with the circular ring at two portions, the grip covers 203 and 204 are located so as to include the two portions. It can be said that the analog stick 52 and the operation buttons 53 to 56 are provided in an area that is not reached by the hands of the user when the user is holding the two portions. Thus, in the present embodiment, it is difficult for the user to operate the analog stick 52 and the operation buttons 53 to 56 when the user is holding the grip covers 203 and 204.

Figure 9:
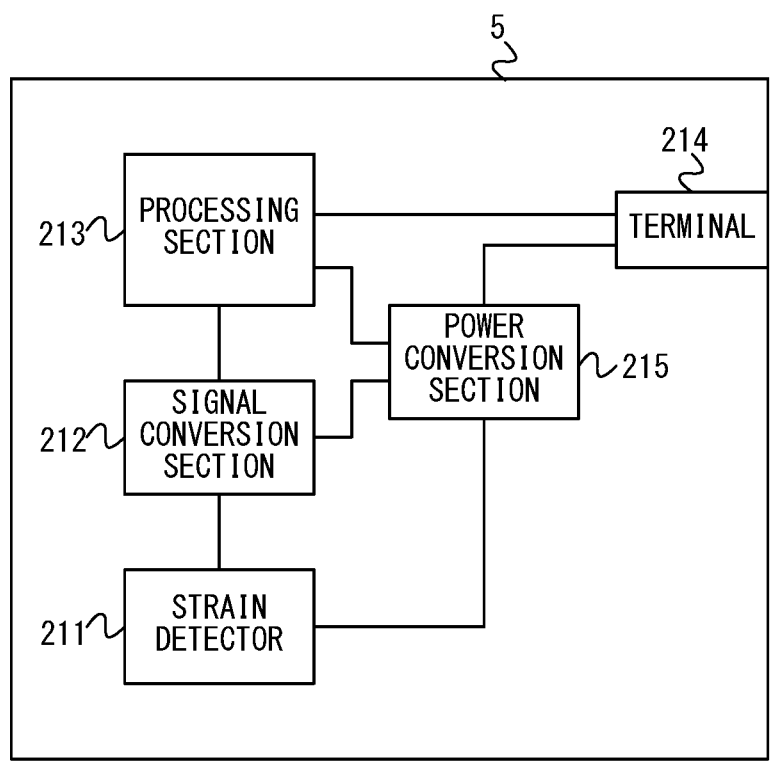
FIG. 9 is a block diagram showing an example of an internal configuration of the non-limiting ring-shaped extension apparatus 5.

FIG. 9 is a block diagram showing an electrical connection relationship between components of the ring-shaped extension apparatus 5. As shown in FIG. 9, the ring-shaped extension apparatus 5 includes a strain detector 211. The strain detector 211 is an example of a detector that detects deformation of the ring-shaped portion 201. In the present embodiment, the strain detector 291 includes a strain gauge. The strain detector 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 8 since the base portion is provided inside the main portion 202. The base portion is made of a material having a higher rigidity than the elastic member. For example, the elastic member is made of a resin (e.g., an FRP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detector 211 may include, instead of the strain gauge, any sensor that is capable of detecting the deformation of the ring-shaped portion 201 from the normal state. For example, the detector 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal conversion section 212. In the present embodiment, the signal conversion section 212 includes an amplifier and an AD converter. The signal conversion section 212 is electrically connected to the strain detector 211 so as to amplify the output signal from the strain detector 211 through the amplifier and performs an AD conversion through the AD converter. The signal conversion section 212 outputs a digital signal representing the strain value detected by the strain detector 211. Note that in other embodiments, the signal conversion section 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal conversion section 212, and the output signal from the signal conversion section 212 is input to the processing section 213. The ring-shaped extension apparatus 5 includes the terminal 214. The terminal 214 is electrically connected to the processing section 213. When the right controller 4 is attached to the ring-shaped extension apparatus 5, the processing section 213 sends information representing the strain value that is represented by the output signal from the signal conversion section 212 (in other words, the ring operation data) to the right controller 4 through the terminal 214.

The ring-shaped extension apparatus 5 includes a power conversion section 215. The power conversion section 215 is electrically connected to the sections 211 to 214. The power conversion section 215 supplies power, which is supplied from the outside (i.e., the right controller 4) through the terminal 214, to the sections 211 to 214. The power conversion section 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 10:
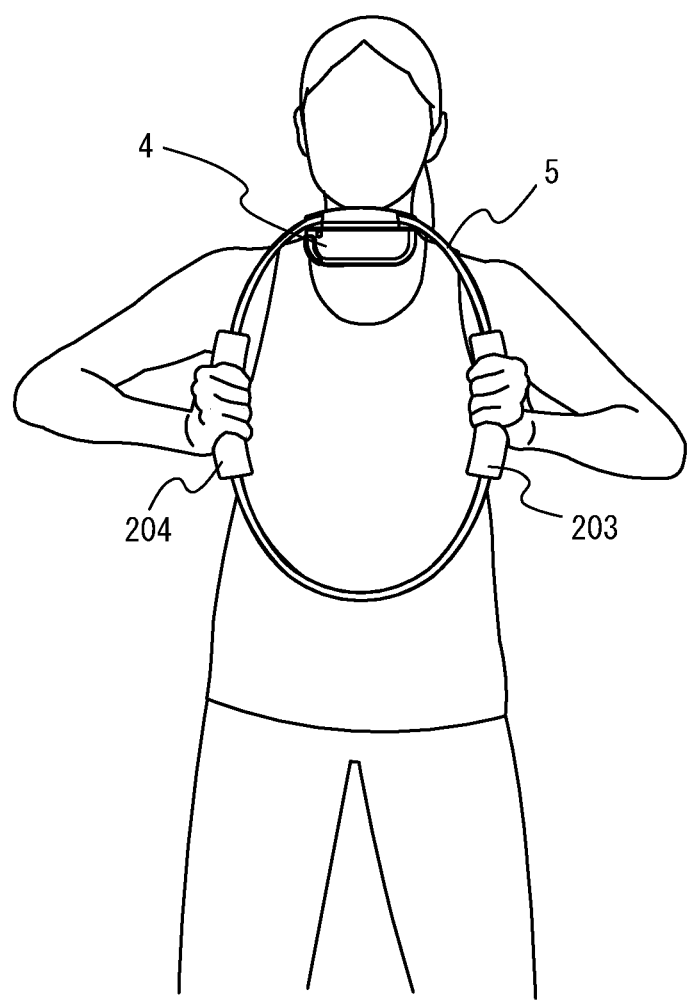
FIG. 10 is a diagram showing an example of a state where a user uses the non-limiting ring-shaped extension apparatus 5.

FIG. 10 is a diagram showing an example of how the ring-shaped extension apparatus 5 is used by the user. As shown in FIG. 10, the user can play a game using the ring-shaped extension apparatus 5 in addition to a game apparatus (e.g., the main body apparatus 2 and the controllers 3 and 4).

For example, as shown in FIG. 10, the user holds the ring-shaped extension apparatus 5 with the right controller 4 attached thereto with both hands. The user can play a game by performing an operation using the ring-shaped extension apparatus 5 (e.g., an operation of deforming the ring-shaped extension apparatus 5 and an operation of moving the ring-shaped extension apparatus 5).

Note that FIG. 10 shows an example of how the user holds the grip covers 203 and 204 and deforms the ring-shaped extension apparatus 5 by pushing in the ring-shaped extension apparatus 5. Through this action, the user can perform, as a game operation, a fitness exercise operation of training the arms. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles. Thus, according to the present embodiment, by using the ring-shaped extension apparatus 5, which has a ring shape, the user can perform a wide variety of fitness exercise operations.

Where the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that, in the case where the right controller 4 is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

2. Outline of Processing Regarding Menu

Next, the outline of processing executed in the game system 1 when a menu is presented to a user, will be described. In the present embodiment, the game system 1 executes a game application that enables the user to perform a game when the user performs a fitness exercise operation by using the ring-shaped extension apparatus 5 to which the right controller 4 is attached. Further, in the game application, the menu is presented in appropriate periods before and after the game (note that the menu may be presented in a period when the game is temporarily suspended during execution). The menu is a user interface for presenting a plurality of items to the user, accepting an instruction regarding an item from the user, and executing a process according to the accepted instruction. For example, the menu presents a plurality of items, and the game system 1 executes a process according to an item selected based on an instruction of the user on the menu.

In the present embodiment, the user can also perform an instruction on the menu by using the ring-shaped extension apparatus 5 to which the right controller 4 is attached. Therefore, in the game application, the user can perform an instruction not only during the game but also in the period when the menu is presented, by using the ring-shaped extension apparatus 5 to which the right controller 4 is attached.

In the present embodiment, the game system 1 presents the menu to the user by displaying a menu image on the display device. In another embodiment, the menu may be presented to the user by not only an image but also a voice. For example, the game system 1 may present the menu to the user in a form of voice guidance that outputs a plurality of items through a voice (i.e., reads out the plurality of items).

[2-1. Menu Image]

Figure 11:
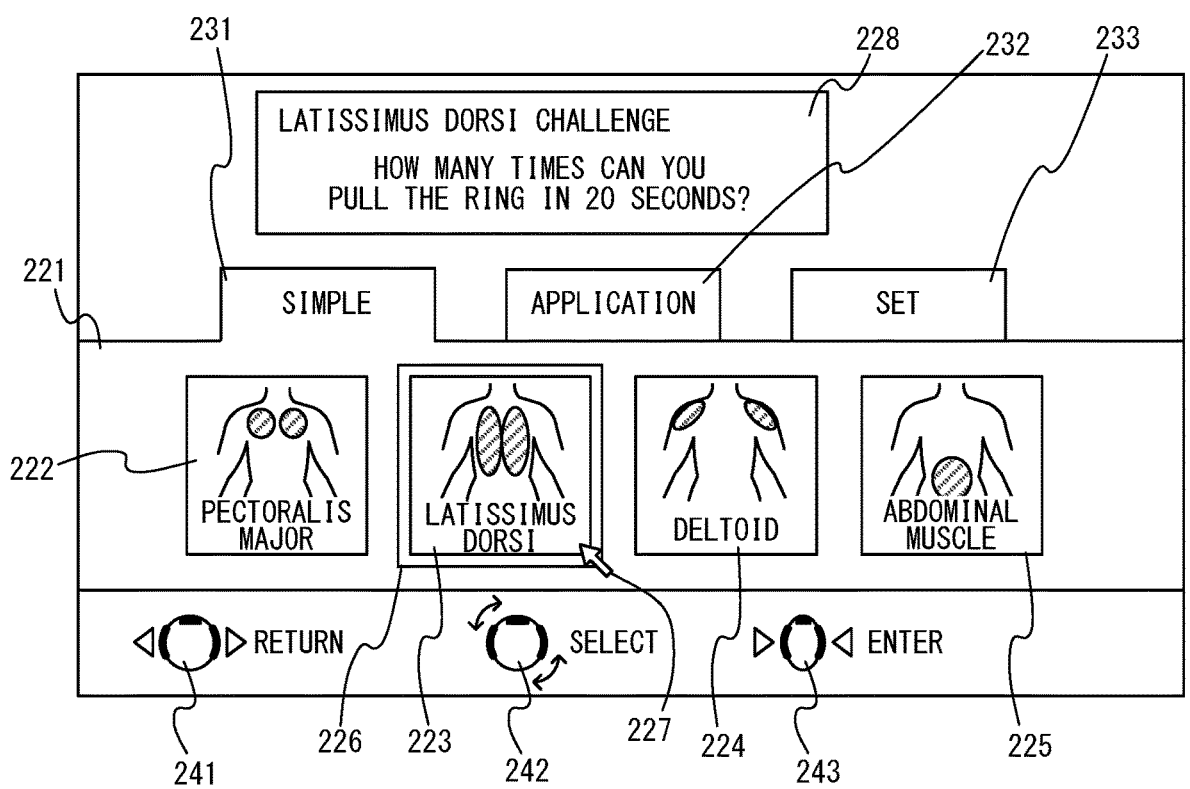
FIG. 11 is a diagram showing an example of a menu image displayed in the present embodiment.

FIG. 11 shows an example of a menu image displayed in the present embodiment. A display device on which the menu image is displayed may be the display 12 described above or a stationary monitor. The menu image shown in FIG. 11 is a menu image for presenting, as the plurality of items, a plurality of types of mini games to a user, and starting a mini game selected by the user. The game application of the present embodiment includes a plurality of game modes, and the game modes include a mini game mode for performing the plurality of types of mini games. The menu image is displayed when the mini game mode is started, for example. Note that the contents of the plurality of items presented in the menu are optional. In another embodiment, the menu may present, as the plurality of items, a plurality of game objects (game characters, game items, etc.), or may present a plurality of game stages.

The game system 1 accepts an instruction on the menu from the user. The "instruction on the menu" is a command that is performed by the user to an information processing system (in the present embodiment, the game system 1) and is accepted by the information processing system through the menu. In the present embodiment, the game system 1 accepts, as instructions to the menu, three types of instructions including a switching instruction, a determination instruction, and a cancel instruction. The switching instruction is an instruction to change an item in a state of being selected among the plurality of items. The determination instruction is an instruction to execute a process according to an item being selected. Note that the "state of being selected" can be regarded as a "state of being specified" as a target of a process to be executed according to the determination instruction. The cancel instruction is an instruction to restore the process executed according to the determination instruction to the state before the execution. The details of operations to be performed by the user for these instructions will be described below. In another embodiment, instructions to be accepted by the game system 1 as the instructions on the menu are not limited to the above three types of instructions, and may include other instructions (e.g., an instruction to scroll the menu image if the menu image is scrollable) different from the above instructions.

As shown in FIG. 11, the menu image includes an item presentation area 221. The item presentation area 221 is an area where icons representing mini games, which are examples of presented items, are displayed. In the example of FIG. 11, four icons 222 to 225 respectively representing mini games are displayed in the item presentation area 221.

As shown in FIG. 11, the menu image includes a frame 226 and an arrow 227 as a cursor indicating an item being selected. The cursor indicates one item in the state of being selected (specifically, one of the mini games represented by the icons or one of groups represented by tabs described below). In the present embodiment, the icon representing the mini game in the state of being selected is enclosed by the frame 226, and the arrow 227 is displayed so as to point the icon. Although details will be described below, the cursor is moved in response to that the item being selected is switched by a switching instruction.

As shown in FIG. 11, the menu image includes a game description area 228. The game description area 228 is an area where the game content of the mini game in the state of being selected is described. The game system 1 changes the display content in the game description area 228 in response to that the mini game in the state of being selected is switched by a switching instruction.

As shown in FIG. 11, in the present embodiment, a plurality of tabs (three tabs 231 to 233) are provided in the item presentation area 221. Each of the mini games in the mini game mode falls into any of a plurality of groups, and one tab represents one group. That is, in the example of FIG. 11, the plurality of mini games in the mini game mode are classified into three groups, "simple", "application", and "set".

In the present embodiment, the user, through the switching instruction, can cause not only a mini game represented by one icon but also a group represented by one tab to be in the state of being selected. That is, in the present embodiment, the user, through the switching instruction, can move the cursor to not only the position indicating the icon but also the position indicating the tab.

When one of the groups represented by the plurality of tabs enters the state of being selected, the game system 1 changes the display content in the item presentation area 221 according to the group in the state of being selected. Specifically, in the item presentation area 221, the icons representing the mini games included in the group in the state of being selected are displayed. Note that FIG. 11 shows a state where the icons of the mini games that belong to the group of "simple" are displayed in the item presentation area 221.

In the item presentation area 221, the icons of the mini games that belong to one tab may be displayed at one time, or some of the icons of the mini games may be displayed. In the latter case, the game system 1 may change the icons to be displayed in the item presentation area 221 by scrolling the display content in the item presentation area 221 according to an instruction of the user.

[2-2. Process According to Instruction Performed on Menu]

Next, processes to be executed in response to the respective instructions performed on the menu will be described. When a switching instruction has been accepted, the game system 1 performs switching of an object (specifically, an item or a tab) in the state being selected from an object being currently selected to another object. In the present embodiment, the game system 1 accepts, as the switching instruction, any of an upward switching instruction, a downward switching instruction, a leftward switching instruction, and a rightward switching instruction. The upward switching instruction is an instruction to switch the object in the state of being selected to an object located above this object in the menu image. Likewise, the downward switching instruction, the left switching instruction, and the right switching instruction are instructions to switch the object in the state of being selected to objects located in the corresponding directions with respect to this object in the menu image.

For example, in the state shown in FIG. 11 (i.e., the state where a mini game of "latissimus dorsi" is being selected"), when an upward switching instruction has been accepted, the game system 1 causes the tab of "simple", which is located above the icon 223 representing the mini game of "latissimus dorsi", to enter the state of being selected, and releases the mini game of "latissimus dorsi" from the state of being selected. At this time, the cursor moves from the icon 223 representing the mini game of "latissimus dorsi" to the tab of "simple". In response to the tab having entered the state of being selected as described above, the display content in the item presentation area 221 is changed according to need. Meanwhile, for example, when a left switching instruction has been accepted in the state shown in FIG. 11, the game system 1 causes a mini game of "pectoralis major", which is represented by the icon 222 located to the left of the icon 223 representing the mini game of "latissimus dorsi", to enter the state of being selected, and releases the mini game of "latissimus dorsi" from the state of being selected. At this time, the cursor moves from the icon 223 representing the mini game of "latissimus dorsi" to the icon 222 representing the mini game of "pectoralis major". On the menu image, if another object is not present in the direction indicated by the switching instruction with respect to the object in the state of being selected, switching of the object in the state of being selected is not executed. For example, in the state shown in FIG. 11, when a downward switching instruction has been accepted, since neither a tab nor an icon is present below the icon 223 representing the mini game of "latissimus dorsi", the mini game of "latissimus dorsi" remains as the object in the state being selected.

When a determination instruction has been accepted, the game system 1 executes a process associated with the item in the state of being selected. In the present embodiment, the "process associated with an item" is a process for starting a mini game. For example, as a "process associated with an item", the game system 1 may display a confirmation window for making an inquiry to confirm whether or not to start the mini game. At this time, if another determination instruction has been performed with the confirmation window being displayed, the game system 1 executes the process of starting the mini game. The confirmation window is displayed to be superimposed on (in other words, in front of) the menu image, and includes, for example, a message such as "Will you start the game?" and a button image indicating "OK". With the confirmation window being displayed, the game system 1 accepts one of a determination instruction and a cancel instruction. In this state, the game system 1 does not accept a switching instruction. Note that the confirmation window may include a button image indicating "NO" in addition to the button image indicating "OK". At this time, the game system 1 switches a button image in the state of being selected, according to a switching instruction. Upon accepting a determination instruction while the button image indicating "NO" is in the state of being selected, the game system 1 may execute the same process as in the case where a cancel instruction has been accepted, described below.

When a cancel instruction has been accepted, the game system 1 restores the state of the menu image to the state before execution of the process performed according to the most recent determination instruction. For example, when a cancel instruction has been accepted with the confirmation window being displayed, the game system 1 restores the state of the menu image to the state before execution of the "process of displaying the confirmation window" that was performed according to the most recent determination instruction, that is, to the state where the menu image is displayed with the confirmation window being not displayed and the cursor indicates the item that was subjected to the determination instruction. Meanwhile, for example, when a cancel instruction has been accepted in the state where the menu image is displayed with the confirmation window being not displayed, the game system 1 restores the display image to the state before the display of the menu image. For example, a case is considered where the menu image shown in FIG. 11 is a menu image displayed according to a determination instruction that has been performed on another menu image (a menu image other than the menu image shown in FIG. 11) for selecting one game mode from among a plurality of game modes. In this case, when a cancel instruction has been accepted while the menu image shown in FIG. 11 is displayed, the game system 1 displays the other menu image.

In the present embodiment, when a determination instruction has been accepted while a group represented by a tab is in the state of being selected, the game system 1 executes no process. That is, in the present embodiment, among the items presented in the menu, the mini games are subjected to the determination instruction whereas the groups are not subjected to the determination instruction. Thus, the items presented in the menu may include items not to be subjected to the determination instruction. However, as described below, the groups may also be subjected to the determination instruction. In the case where the groups are subjected to the determination instruction, an area where the tabs representing the groups are displayed can be considered to be the item presentation area described above.

The content of the "process associated with an item" is also optional. For example, in a menu image that presents a plurality of characters as a plurality of items, the "process associated with an item" may be a process of setting a character corresponding to the item as a player character to be used by a player in a game. Alternatively, for example, in a menu image that presents a plurality of game stages as a plurality of items, the "process associated with an item" may be a process of starting a game using a game stage corresponding to the item. In another embodiment, a plurality of sub items may be associated with one item in the menu image. When a determination instruction has been performed on this item, the game system 1 may execute a process of displaying the sub items as the "process associated with an item". At this time, if a cancel instruction has been performed with the sub items being displayed, the game system 1 may end the display of the sub items, and may display the original menu image in the state where the cursor indicates the item that was subjected to the determination instruction.

In the above embodiment, switching of the cursor between a tab and an icon is performed in response to a switching instruction. In another embodiment, this switching may be performed in response to a determination instruction or a cancel instruction. Specifically, when a determination instruction has been accepted while a tab is in the state of being selected in the menu image, the game system 1 causes any one of the icons of the mini games included in the group represented by the tab to be in the state of being selected. Meanwhile, when a cancel instruction has been accepted while an icon is in the state of being selected in the menu image, the game system 1 restores the menu image to the state before execution of the process according to the most recent determination instruction, that is, to the state where the tab, which represents the group of the mini games represented by the icons being displayed, is in the state of being selected.

[2-3. Operation to Perform Instruction on Menu]

Next, an operation method for performing an instruction on a menu will be described. In the present embodiment, a user can perform an instruction on the menu through an operation performed to the right controller 4 attached to the ring-shaped extension apparatus 5, and can also perform an instruction on the menu through an operation performed to the ring-shaped extension apparatus 5.

[2-3-1. Operation to Controller 4]

When the user has performed an operation described below to the right controller 4 attached to the ring-shaped extension apparatus 5, the game system 1 accepts an instruction on the menu. Specifically, the game system 1 accepts an upward switching instruction through an operation of tilting the analog stick 52 of the right controller 4 upward, accepts a downward switching instruction through an operation of tilting the analog stick 52 of the right controller 4 downward, accepts a left switching instruction through an operation of tilting the analog stick 52 of the right controller 4 leftward, and accepts a right switching instruction through an operation of tilting the analog stick 52 of the right controller 4 rightward. The directions of the analog stick 52 described above are based on the orientation of the right controller 4 being attached to the ring-shaped extension apparatus 5 (see FIG. 8). For example, the upward direction of the analog stick 52 is a direction from the center of the right controller 4 attached to the ring-shaped extension apparatus 5 to the center of the main portion 202 of the ring-shaped extension apparatus 5. In addition, the game system 1 accepts a determination instruction through an operation of pressing the X-button 55 of the right controller 4. Further, the game system 1 accepts a cancel instruction through an operation of pressing the A-button 53 of the right controller 4.

[2-3-2. Operation on Ring-Shaped Extension Apparatus 5]

Figure 12:
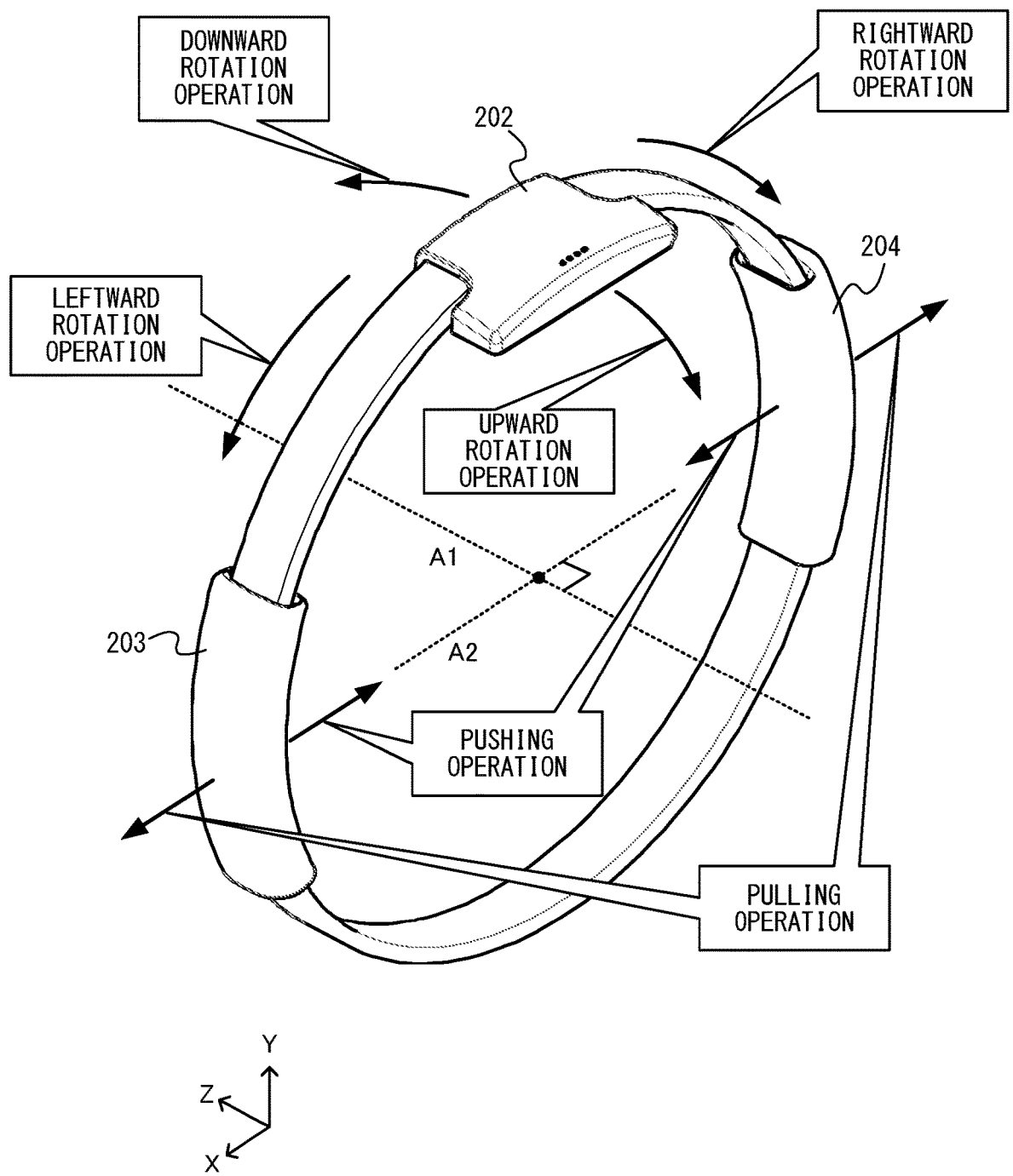
FIG. 12 is a diagram showing an example of operations performed to the non-limiting ring-shaped extension apparatus 5 in order to perform instructions on a menu.

The game system 1 also accepts an instruction on the menu when the user has performed an operation described below to the ring-shaped extension apparatus 5. FIG. 12 shows examples of operations that are performed to the ring-shaped extension apparatus 5 to perform instructions on the menu. In FIG. 12, for the sake of viewability of the drawing, the right controller 4 attached to the ring-shaped extension apparatus 5 is omitted. Hereinafter, the operations performed to the ring-shaped extension apparatus 5 to perform the instructions on the menu will be described with reference to FIG. 12.

(Rotation Operation)

The game system 1 accepts a switching instruction when the user has performed an operation of rotating the ring-shaped extension apparatus 5 in a reference orientation. The "reference orientation" of the ring-shaped extension apparatus 5 is an orientation in which, when the user directly faces the ring-shaped extension apparatus 5 (i.e., when the front side of the ring-shaped extension apparatus 5 is the near side as viewed from the user), a center axis A1 of the ring-shaped portion 201 is horizontal and the main portion 202 of the ring-shaped extension apparatus 5 is positioned at the upper end of the ring-shaped extension apparatus 5 (see FIG. 12).

There are four types of rotation operations, i.e., an upward rotation operation, a downward rotation operation, a leftward rotation operation, and a rightward rotation operation. The game system 1 accepts an upward switching instruction through an upward rotation operation performed to the ring-shaped extension apparatus 5, and accepts a downward switching instruction through a downward rotation operation performed to the ring-shaped extension apparatus 5. Each of the upward rotation operation and the downward rotation operation is an operation of rotating the ring-shaped extension apparatus 5 in the reference orientation, about an axis A2 as a rotation axis which is in a direction parallel to a horizontal plane and perpendicular to the center axis A1 (see FIG. 12). Specifically, the upward rotation operation is an operation of rotating the ring-shaped extension apparatus 5 such that an upper end portion of the ring-shaped extension apparatus 5 in the reference orientation tilts toward the near side (i.e., in the Z-axis negative direction shown in FIG. 12) and a lower end portion of the ring-shaped extension apparatus 5 tilts toward the back side (i.e., in the Z-axis positive direction shown in FIG. 12) (see FIG. 12). Meanwhile, the downward rotation operation is an operation of rotating the ring-shaped extension apparatus 5 such that the upper end portion of the ring-shaped extension apparatus 5 in the reference orientation tilts toward the back side and the lower end portion of the ring-shaped extension apparatus 5 tilts toward the near side (see FIG. 12).

The game system 1 accepts a left switching instruction through a leftward rotation operation performed to the ring-shaped extension apparatus 5, and accepts a right switching instruction through a rightward rotation operation performed to the ring-shaped extension apparatus 5. Each of the leftward rotation operation and the rightward rotation operation is an operation of rotating the ring-shaped extension apparatus 5 in the reference orientation about the center axis A1 as a rotation axis (see FIG. 12). Specifically, the leftward rotation operation is an operation of rotating the ring-shaped extension apparatus 5 in the reference orientation leftward as viewed from the near side, and the rightward rotation operation is an operation of rotating the ring-shaped extension apparatus 5 rightward as viewed from the near side (see FIG. 12).

In the present embodiment, when the rotation angle of the ring-shaped extension apparatus 5 from the reference orientation has become equal to or greater than a predetermined angle, the game system 1 detects a rotation operation (i.e., determines that a rotation operation has been performed). At the time when the rotation angle has become equal to or greater than the predetermined angle, the game system 1 detects the rotation operation and determines that one switching instruction has been performed (i.e., accepts a first switching instruction). Then, when the state where the rotation angle is equal to or greater than the predetermined angle has been maintained for a time period longer than a predetermined first successive instruction time (e.g., 3 seconds), the game system 1 determines that switching instructions have been successively performed (i.e., successively accepts a plurality of times of switching instruction and, for example, executes a process of changing an item being selected). In this case, when the first successive instruction time has passed, the game system 1 determines that a second switching instruction has been performed. Thereafter, the game system 1 determines that one switching instruction has been performed each time a second successive instruction time (e.g., 0.5 second) shorter than the first successive instruction time has passed. The game system 1 stops accepting switching instructions in response to that the rotation angle has become smaller than the predetermined angle. Therefore, if the user wants to perform only one switching instruction, the user may perform an operation to make the rotation angle smaller than the predetermined angle after the user has performed a rotation operation and before the successive instruction time passes. Meanwhile, when the user wants to successively perform a plurality of times of switching instruction, the user may perform an operation to maintain the state where the rotation angle is equal to or greater than the predetermined angle even after the successive instruction time has passed from when the user performed the rotation operation. Therefore, in the present embodiment, when the user wants to successively perform a plurality of times of switching instruction, the user need not restore the ring-shaped extension apparatus 5 to the state where the rotation angle is smaller than the predetermined angle. Thus, operability of the ring-shaped extension apparatus 5 when switching operations are performed can be improved. In the present embodiment, the user can successively perform a plurality of times of switching instruction by the method of maintaining the state where the rotation angle is equal to or greater than the predetermined angle. Also, the user can successively perform a plurality of times of switching instruction by repeating the operation of performing just one switching instruction.

In the present embodiment, the game system 1 executes, for each of the rotation operations, a process of successively accepting a plurality of switching instructions. In another embodiment, the game system 1 may execute this process only for some rotation operations. For example, the game system 1 may execute the process only for the leftward rotation operation and the rightward rotation operation without executing the process for the upward rotation operation and the downward rotation operation. The reason is as follows. In the menu image shown in FIG. 11, each of the upward switching instruction and the downward switching instruction is performed just for switching the cursor between an item and a tab, and therefore, necessity of successively accepting a plurality of times of this switching instruction is low.

The game system 1 calculates the rotation angle based on an output from a sensor (the acceleration sensor 114 in the present embodiment) of the right controller 4. Specifically, the game system 1 calculates the direction of gravity applied to the ring-shaped extension apparatus 5 (i.e., in what direction the gravity is applied with respect to the ring-shaped extension apparatus 5) based on the output of the acceleration sensor 114, and calculates the rotation angle based on the calculated direction. In another embodiment, the game system 1 may calculate the rotation angle based on an output of the angular velocity sensor 115. In the calculation method based on the output of the angular velocity sensor 115, since drift errors of the angular velocity sensor 115 are accumulated, accurate calculation of the rotation angle may not be performed. In contrast, according to the calculation method based on the output of the acceleration sensor 114, since the rotation angle can be calculated based on the direction of gravity at the present time, no errors are accumulated, whereby accurate calculation of the rotation angle can be achieved.

In the present embodiment, as for a rotation operation to perform an instruction on the menu, a rotation operation about the axis not parallel to the direction of gravity (i.e., the axis A1 or the axis A2 shown in FIG. 12) is used. Here, a case where a rotation operation about an axis parallel to the direction of gravity is used as a rotation operation for performing an instruction on the menu, is considered. In this case, since it is difficult to calculate the rotation angle based on the output of the acceleration sensor 114, the rotation angle is supposed to be calculated according to the method based on the output of the angular velocity sensor 115. In this method, however, accumulated drift errors of the angular velocity sensor 115 may make it difficult to accurately calculate the rotation angle. Meanwhile, in the present embodiment, the game system 1 executes a process according to the instruction on the menu (specifically, changes an item in the state of being selected among the plurality of items in the menu) in accordance with the rotation operation of rotating the ring-shaped extension apparatus 5 about the axis not parallel to the direction of gravity. Thus, the rotation operation can be detected based on the output of the acceleration sensor 114, whereby the rotation angle can be accurately calculated.

(Push-in Operation/Pull Operation)

The game system 1 accepts a determination instruction as described above when the user has performed an operation of pushing the ring-shaped extension apparatus 5 inward (hereinafter, this operation is referred to as "push-in operation"). The push-in operation is an operation to deform the ring-shaped portion 201 in a direction (referred to as "pushing direction") in which the two grip portions of the ring-shaped extension apparatus 5 approach each other (see FIG. 12). In the present embodiment, when the amount of deformation (referred to as "pushing amount") of the ring-shaped portion 201 in the pushing direction from the stationary state has become equal to or more than a threshold value, the game system 1 detects the push-in operation. The method of setting the threshold value for detecting the push-in operation is described below.

The game system 1 accepts a cancel instruction as described above when the user has performed an operation of pulling the ring-shaped extension apparatus 5 (hereinafter, this operation is referred to as "pull operation"). The pull operation is an operation to deform the ring-shaped portion 201 in a direction (referred to as "pulling direction") in which the two grip portions are away from each other (see FIG. 12). In the present embodiment, when the amount of deformation of the ring-shaped portion 201 in the pulling direction from the stationary state has become equal to or more than a threshold value, the game system 1 detects the pull operation.

The game system 1 does not accept a rotation operation during a period in which the push-in operation is being performed to the ring-shaped extension apparatus 5. The reason is as follows. During the push-in operation, the user may unconsciously rotate the ring-shaped extension apparatus 5 and then a rotation operation not intended by the user may be detected. In the present embodiment, the game system 1 does not execute a process based on an output from a sensor for detecting the motion of the ring-shaped extension apparatus 5 (here, a process according to a switching instruction caused by a rotation operation) during a predetermined period (here, a period during the push-in operation) included in the period in which the ring-shaped extension apparatus 5 is being deformed in the pushing direction. Thus, it is possible to reduce the likelihood that a rotation operation not intended by the user is detected during the push-in operation and thereby a process not intended by the user is executed. The predetermined period may be the whole period of the push-in operation (i.e., the period in which the pushing amount is equal to or more than the threshold value), or may be a period in which the pushing amount is equal to or more than a certain value (this value may be less or more than the threshold value).

As described above, in the present embodiment, the user can perform an instruction on the menu through both the operation performed to the right controller 4 and the operation performed to the ring-shaped extension apparatus 5. It can be said that the ring-shaped extension apparatus 5 to which the right controller 4 is attached is provided with an operation section (here, the analog stick 52, the A-button 53, and the X-button 55) capable of accepting an operation different from the operation to deform the ring-shaped extension apparatus 5. The main body apparatus 2 receives operation information (i.e., the right controller operation data) based on the output of the operation section. When the received operation information indicates an output obtained when a first operation (i.e., an operation of pressing the X-button 55) is performed to the operation section, the main body apparatus 2 executes a process according to a first instruction (i.e., a determination instruction). When the received operation information indicates an output obtained when a second operation (i.e., an operation of pressing the A-button 53) different from the first operation, the main body apparatus 2 executes a process according to a second instruction (i.e., a cancel instruction).

In the present embodiment, the operation section (i.e., the analog stick 52, the A-button 53, and the X-button 55) is provided in an area that is not reached by the hands of the user when the user is holding the two grip portions of the ring-shaped extension apparatus 5 in the stationary state (see FIG. 8). Therefore, when it is assumed that the user is allowed to perform an instruction on the menu only through the operation section, the user, who is holding the grip portions of the ring-shaped extension apparatus 5 with both hands during the game, should release either of the hands from the grip portion to operate the operation section while the menu is presented. Thus, the user has to change the manner of holding the ring-shaped extension apparatus 5 between when the user is playing the game and when the menu is presented.

Meanwhile, in the present embodiment, since the user can perform an instruction on the menu through the operation to the ring-shaped extension apparatus 5, the user need not change the manner of holding the ring-shaped extension apparatus 5 between when the user is playing the game and when the menu is presented. Thus, usability of the ring-shaped extension apparatus 5 can be improved. In addition, in the present embodiment, the user is also allowed to perform an instruction on the menu by using the operation section, and therefore, can perform an instruction through either operation matching his/her preference. Thus, usability of the ring-shaped extension apparatus 5 is further improved.

In the present embodiment, when there are a plurality of types of menus that are presented during execution of the game application, an instruction may be performed on some of the menus only through an operation to the right controller 4, and an instruction on these menus through an operation to the ring-shaped extension apparatus 5 may not be accepted. That is, the function of accepting an instruction performed on the menu through an operation to the ring-shaped extension apparatus 5 need not be applied to all the menus but may be applied to some menus.

In the present embodiment, the two directions, in which the ring-shaped extension apparatus 5 is deformed in the operation for performing two instructions on the menu, are the direction in which the two grip portions approach each other and the direction in which the two grip portions are away from each other (see FIG. 12). The two directions can also be regarded as: a direction in which a portion (i.e., the left grip portion) provided on one side with respect to a predetermined portion (i.e., the main portion 202) of the ring-shaped extension apparatus 5 and a portion (i.e., the right grip portion) provided on the other side with respect to the predetermined portion approach each other; and a direction in which these portions (i.e., the left grip portion and the right grip portion) are away from each other. The two directions can also be regarded as: a direction in which the ring-shaped extension apparatus 5 deforms such that the output of the distortion detection portion 211 increases as compared to that in the case where the ring-shaped extension apparatus 5 is in the stationary state; and a direction in which the ring-shaped extension apparatus 5 deforms such that the output of the distortion detection portion 211 decreases as compared to that in the case where the ring-shaped extension apparatus 5 is in the stationary state. In the present embodiment, the game system 1 allows different instructions to be performed according to the two directions described above, thereby allowing the user to easily perform two types of instructions through the operations of deforming the ring-shaped extension apparatus 5.

Furthermore, in the present embodiment, the game system 1 executes a process according to a determination instruction and a process according to a cancel instruction (i.e., a process of restoring the result of the process executed according to the determination instruction) through the operations to deform the ring-shaped extension apparatus 5 in the two directions described above (i.e., the push-in operation and the pull operation). Thus, according to the present embodiment, the user can perform the two types of instructions forming a pair, i.e., determination and cancellation, through the two types of operations forming a pair, i.e., pushing and pulling. Thus, the game system 1 can provide the user with the operation method that the user can easily and intuitively understand.

In the present embodiment, the game system 1 receives sensor information based on an output of the sensor (i.e., the acceleration sensor 114 and/or the angular velocity sensor 115) for detecting the motion of the ring-shaped extension apparatus 5, and executes a process of selecting one item from among a plurality of items (i.e., causing one item to be in the state of being selected). Thus, not only a determination instruction and a cancel instruction but also a switching instruction can be performed through operations using the ring-shaped extension apparatus 5, thereby enabling various types of operations by using the ring-shaped extension apparatus 5. Thus, usability of the ring-shaped extension apparatus 5 can be improved.

The content of the operation performed to the ring-shaped extension apparatus 5 by the user for a switching instruction is optional, and is not limited to the rotation operation described above. The game system 1 may accept a switching instruction through any operation to change the position and/or the orientation of the ring-shaped extension apparatus 5. For example, in another embodiment, the game system 1 may accept an upward, downward, leftward, or rightward switching instruction according to an operation of moving the ring-shaped extension apparatus 5 horizontally in the upward, downward, leftward, or rightward direction as viewed from the user. Whether or not this operation has been performed can be determined based on an output of the acceleration sensor 114 of the right controller 4 attached to the ring-shaped extension apparatus 5.

In another embodiment, the game system 1 may control the movement of the cursor such that the cursor points any position on the menu image according to a rotation operation performed to the ring-shaped extension apparatus 5. That is, in the present embodiment, the arrow 227 of the cursor is located only at a position indicating any one of the items and the tabs in the menu image. In another embodiment, the cursor may be located at any position on the menu image according to the rotation operation. For example, the game system 1 may cause the cursor to move upward, downward, leftward, or rightward from the center of the menu image according to an upward, downward, leftward, or rightward rotation operation to the ring-shaped extension apparatus 5 in the reference orientation. At this time, the game system 1 may locate the arrow 227 such that the length from the center of the menu image to the arrow 227 corresponds to the magnitude of the rotation angle of the ring-shaped extension apparatus 5 from the reference orientation.

In the above-described modification in which the movement of the arrow 227 is controlled so as to point any position on the menu image according to the rotation operation, the user may unconsciously rotate the ring-shaped extension apparatus 5 during the push-in operation, and consequently, the arrow 227 may be moved against the intention of the user. In order to avoid such a situation, the game system 1 may cause responsivity of the rotation operation to be reduced in the predetermined period included in the period in which the ring-shaped extension apparatus 5 is being deformed in the pushing direction. This inhibits the rotation operation not intended by the user from being detected during the push-in operation, and inhibits movement of the arrow 227 not intended by the user. The predetermined period may be the whole period of the push-in operation, a period in which the pushing amount is equal to or more than a certain value, or a period of a predetermined length from when the pushing amount has become equal to or more than the certain value. For example, the game system 1 may cause responsivity of the process based on the output of the sensor for detecting the motion of the ring-shaped extension apparatus 5 (specifically, the process of moving the arrow 227 according to the rotation operation) to be reduced in the predetermined period as compared to that in the case where the ring-shaped extension apparatus 5 is in the stationary state. A specific method for reducing the responsivity of the process is optional, and any of methods described below may be adopted. For example, the game system 1 may cause the speed of movement of the arrow 227 during the predetermined period to be reduced (as compared to that in the case where the ring-shaped extension apparatus 5 is in the stationary state), so that the arrow 227 moves slowly even when the orientation of the ring-shaped extension apparatus 5 rapidly changes. Alternatively, for example, the game system 1 may cause the amount of movement of the arrow 227 with respect to the unit change amount of the orientation of the ring-shaped extension apparatus 5 to be less in the predetermined period than in the case where the ring-shaped extension apparatus 5 is in the stationary state. Still alternatively, the game system 1 may cause the arrow 227 not to move in the predetermined period.

In the present embodiment, in the predetermined period, the game system 1 does not execute the process based on the output of the sensor for detecting the motion of the ring-shaped extension apparatus 5 (specifically, the process according to the switching instruction caused by the rotation operation). However, in another embodiment, responsivity of this process may be as in the above-described modification.

In another embodiment, the game system 1 may not execute the process based on the output of the sensor for detecting the motion of the ring-shaped extension apparatus 5 (or may reduce responsivity of this process) in a predetermined period included in the period in which the ring-shaped extension apparatus 5 is being deformed in the pulling direction, in addition to (or instead of) the predetermined period included in the period in which the ring-shaped extension apparatus 5 is being deformed in the pulling direction. Thus, the likelihood of execution of a process not intended by the user during the pull operation can be reduced.

[2-4. Guide Image]

In the present embodiment, a menu image includes a guide image that indicates an operation for performing an instruction on the menu. In the present embodiment, there are two types of guide images, i.e., a ring guide image and a controller guide image. The ring guide image is a guide image that indicates an operation to be performed to the ring-shaped extension apparatus 5 in order to perform an instruction on the menu. The controller guide image is a guide image that indicates an operation to be performed to the right controller 4 in order to perform an instruction on the menu. In the present embodiment, one of the ring guide image and the controller guide image is selectively displayed on the menu image.

FIG. 11 shows a menu image including three ring guide images 241 to 243. The ring guide image 241 indicates a pull operation, and an indication (in FIG. 11, "Return") representing a cancel instruction. The ring guide image 242 indicates a leftward/rightward switching operation, and an indication (in FIG. 11, "Select") representing a switching instruction. The ring guide image 243 indicates a push-in operation, and an indication (in FIG. 11, "Enter") representing a determination instruction. Thus, each ring guide image indicates an operation to the ring-shaped extension apparatus 5, and an instruction corresponding to the operation. In the present embodiment, the ring guide images 241 to 243 present a manner of performing instructions on the menu with the ring-shaped extension apparatus 5 in an easy-to-understand manner to the user.

In the present embodiment, a guide image regarding an upward/downward switching operation is not displayed. In another embodiment, a guide image regarding upward/downward switching operation may be displayed in addition to the three guide images 241 to 243.

Figure 13:
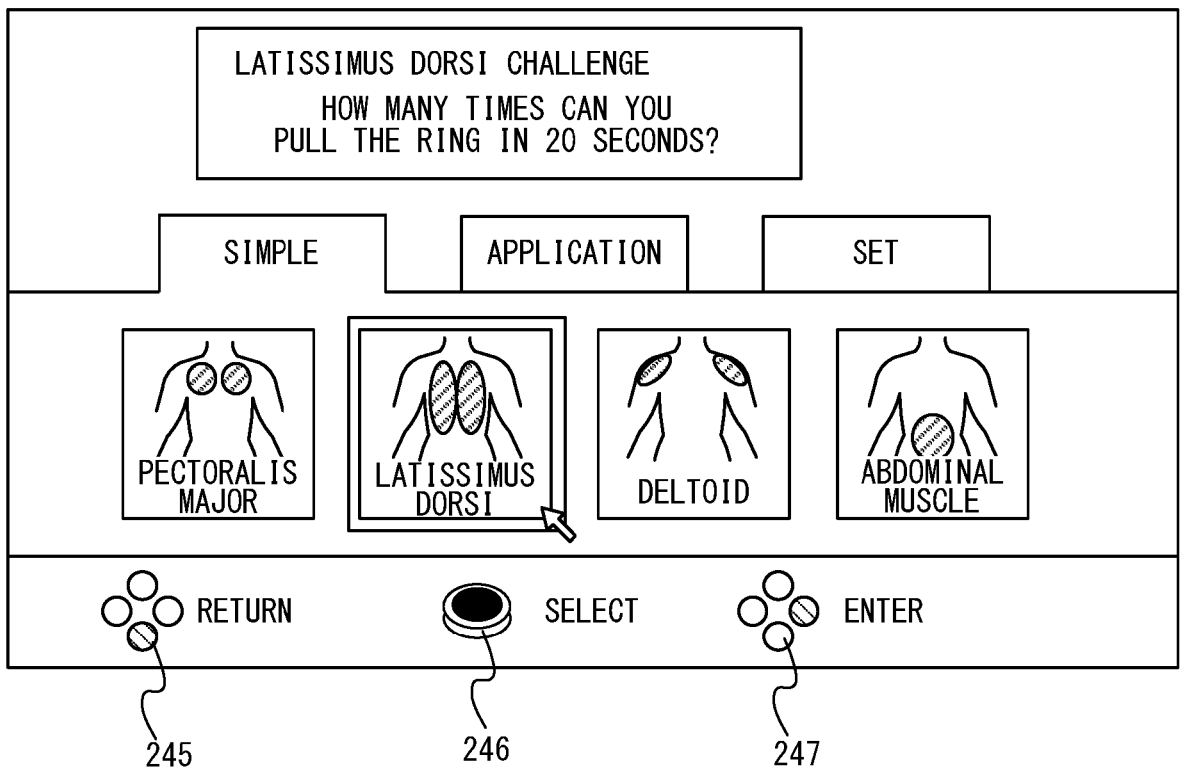
FIG. 13 is a diagram showing an example of a menu image including a controller guide image.

FIG. 13 shows an example of a menu image including controller guide images. In FIG. 13, three controller guide images 245 to 247 are shown. The controller guide image 245 indicates an operation to the A-button 53, and an indication (in FIG. 13, "Return") representing a cancel instruction. The controller guide image 246 indicates an operation to the analog stick 52, and an indication (in FIG. 13, "Select") representing a switching instruction. The controller guide image 247 indicates an operation to the X-button 55, and an indication (in FIG. 13, "Enter") representing a determination instruction. Thus, like the ring guide images, each control guide image indicates an operation to the ring controller 4, and an instruction corresponding to the operation. In the present embodiment, the controller guide images 245 to 247 present a manner of performing instructions on the menu with the right controller 4 in an easy-to-understand manner to the user.

Figure 14:
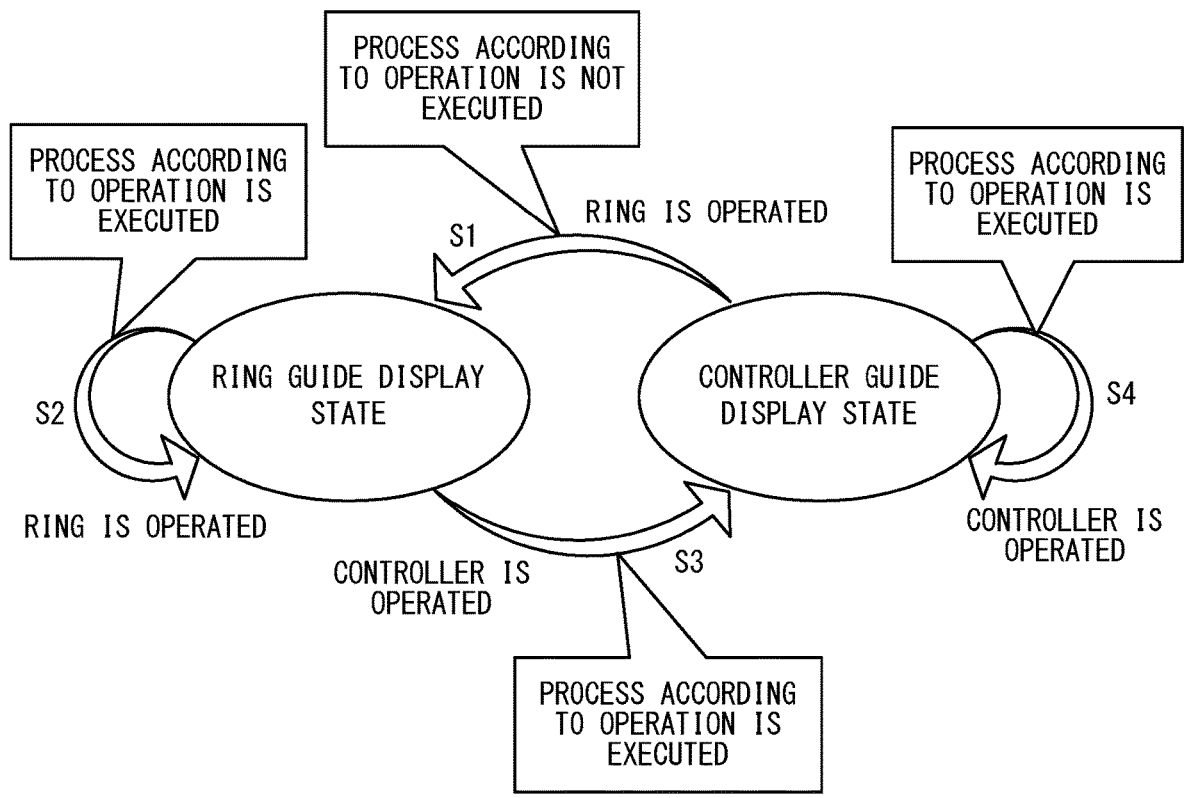
FIG. 14 is a state transition diagram showing an example of state transition regarding a guide image display state.

FIG. 14 is a state transition diagram showing an example of state transition regarding the guide image display state. As shown in FIG. 14, in the present embodiment, in a period in which a menu image in a mini game mode is displayed, the menu image is in either a ring guide display state in which the ring guide image is displayed or a controller guide display state in which the controller guide image is displayed. The state of the menu image when display thereof is started is either of the above-described states (e.g., the ring guide display state) which has been determined in the game application.

In the present embodiment, when an operation to the ring-shaped extension apparatus 5 (i.e., a rotation operation, a push-in operation, or a pull operation) to perform an instruction on the menu has been performed, the game system 1 causes the menu image to be in the ring guide display state. Specifically, when an operation to the ring-shaped extension apparatus 5 has been performed in the controller guide display state, the menu image is caused to transition to the ring guide display state (step S1). Meanwhile, when an operation to the ring-shaped extension apparatus 5 has been performed in the ring guide display state, the ring guide display state is maintained (step S2).

When an operation to the right controller 4 (i.e., an operation to the analog stick 52, the A-button 53, or the X-button 55) to perform an instruction on the menu has been performed, the game system 1 causes the menu image to be in the controller guide display state. Specifically, when the above-described operation has been performed to the right controller 4 in the ring guide display state, the menu image is caused to transition to the controller guide display state (step S3). Meanwhile, when an operation to the right controller 4 has been performed in the controller guide display state, the controller guide display state is maintained (step S4).

In the present embodiment, not only when an operation to any of the analog stick 52, the A-button 53, and the X-button 55 of the right controller 4 has been performed but also when an operation to any of other buttons (specifically, the B-button 54, the Y-button 56, and the "+" button 57) of the right controller 4 has been performed, the game system 1 causes the menu image to transition to the controller guide display state. In this case, however, an instruction on the menu is not accepted, and a process according to the instruction is not executed.

As described above, in the present embodiment, the game system 1 is able to selectively display, on the display device, either the ring guide image indicating the operation to the ring-shaped extension apparatus 5 or the controller guide image indicating the operation to the right controller 4. When the sensor information (i.e., ring operation data) received by the main body apparatus 2 indicates that an operation to the ring-shaped extension apparatus 5 has been performed to perform an instruction on the menu, the game system 1 displays the ring guide image on the display device. Meanwhile, when the operation information (i.e., right controller operation data) received by the main body apparatus 2 indicates that an operation to the right controller 4 has been performed to perform an instruction on the menu, the game system 1 displays the controller guide image on the display device. Thus, displaying either of the guide images leads to saving of the area for displaying the guide image in the menu image. Further, according to the present embodiment, since the guide image regarding a device (i.e., the ring-shaped extension apparatus 5 or the right controller 4), which is expected to be used later by the user, is displayed, the game system 1 can present, to the user, the guide image more useful for the user. When the controller guide image is displayed, a process according to an instruction caused by an operation to the right controller 4 is executed. At this time, either the display of the controller guide image or the execution of the process may be executed first. For example, the controller guide image may be displayed in response to reception of operation information indicating an output obtained when the operation to the right controller 4 has been performed, or may be displayed in response to completion of the process according to the instruction caused by the operation.

In the present embodiment, the ring guide image 241 and the controller guide image 245 each indicating the cancel instruction are displayed at substantially the same position in the menu image, the ring guide image 242 and the controller guide image 246 each indicating the switching instruction are displayed at substantially the same position in the menu image, and the ring guide image 243 and the controller guide image 247 each indicating the determination instruction are displayed at substantially the same position in the menu image (see FIG. 11 and FIG. 13). Thus, in the present embodiment, a ring guide image and a controller guide image indicating the same instruction on the menu are displayed at substantially the same position in the menu image. This enables the game system 1 to present the guide images in an easy-to-understand manner to the user even when switching between the ring guide image and the controller guide image is performed.

As shown in FIG. 14, when the menu image is caused to transition from the ring guide display state to the controller guide display state according to the operation to the right controller 4 (step S3), the game system 1 executes a process according to an instruction caused by this operation (i.e., accepts the instruction). Meanwhile, when the menu image is caused to transition from the controller guide display state to the ring guide display state according to the operation to the ring-shaped extension apparatus 5 (step S1), the game system 1 does not execute a process according to an instruction caused by this operation (i.e., does not accept the instruction). That is, when the operation to the ring-shaped extension apparatus 5 is performed in the controller guide display state, the controller guide image is switched to the ring guide image in the menu image, but the instruction on the menu according to this operation is not accepted. Meanwhile, when transition from the controller guide display state to the ring guide display state has been performed according to a rotation operation, if a rotation operation is again performed after completion of this rotation operation, a process according to an instruction caused by this operation is executed. That is, in the above case, even when the user maintains the state in which the rotation angle of the ring-shaped extension apparatus 5 from the reference orientation has become equal to or greater than the predetermined angle in the rotation operation that has caused the transition, the game system 1 does not successively accept a plurality of times of switching instruction. At this time, when a rotation operation is again performed after the user has restored the ring-shaped extension apparatus 5 to the state where the rotation angle is smaller than the predetermined angle, a process according to an instruction caused by this operation is executed.

As described above, in the present embodiment, in the state (i.e., ring guide display state) where an instruction, on a menu, which has previously been accepted while the menu is presented is an instruction caused by an operation to the ring-shaped extension apparatus 5, if operation information (i.e., right controller operation data), which indicates an output obtained when an operation, to the right controller 4, corresponding to the instruction on the menu was performed, has been received, the main body apparatus 2 executes a process according to the instruction caused by the operation to the right controller 4 (step S3). On the other hand, in the state (i.e., controller guide display state) where an instruction, on a menu, which has previously been accepted while the menu is presented is an instruction caused by an operation to the right controller 4, if sensor information (i.e., ring operation data), which indicates an output obtained when an operation, to the ring-shaped extension apparatus 5, corresponding to the instruction on the menu was performed, has been accepted first, the main body apparatus 2 does not execute a process according to the instruction caused by this operation (step S1). Then, when sensor information indicating the output has been further received, the main body apparatus 2 executes the process according to the instruction caused by the operation (step S2).

When the first operation to the ring-shaped extension apparatus 5 has been performed in the controller guide display state (i.e., when the sensor information indicating the output caused by the operation to the ring-shaped extension apparatus 5 has been received first), the game system 1 does not execute the process according to the instruction caused by the first operation, but may execute other processes different from this process. For example, in the present embodiment, the game system 1 may execute a process of switching the guide image from the controller guide image to the ring guide image, or may execute a process of notifying the user that the operation mode has been changed to the operation using the ring-shaped extension apparatus 5.

When sensor information, which indicates an output obtained when a second or subsequent operation to the ring-shaped extension apparatus 5 was performed, has been further received in the controller guide display state, the game system 1 may execute a process according to an instruction caused by the second or subsequent operation. At this time, the game system 1 may start, from the second operation, execution of the process according to the instruction caused by the operation, or may start, from the third or subsequent operation, execution of the process according to the instruction caused by the operation.

In the controller guide display state, it is expected that the user intends to perform an instruction on the menu by using the right controller 4. In this state, even when an operation to the ring-shaped extension apparatus 5 has been detected, the user may actually not intend to perform an instruction on the menu by using the ring-shaped extension apparatus 5 in some cases. For example, when the ring-shaped extension apparatus 5 is deformed due to a force applied to the ring-shaped extension apparatus 5 while the user holds the ring-shaped extension apparatus 5 with one hand and holds the right controller 4 with the other hand to operate a button on the right controller 4, it is considered that the user does not intend to perform an instruction on the menu by using the ring-shaped extension apparatus 5. In this case, if the game system 1 accepts the instruction on the menu and executes a process according to the instruction, the process may be executed against the intention of the user. Therefore, in the present embodiment, as described above, the game system 1 does not execute a process as for the first operation to the ring-shaped extension apparatus 5. Thus, the likelihood of execution of a process not intended by the user can be reduced. Meanwhile, when an operation to the right controller 4 has been performed, it is less likely that the user has unintentionally performed the operation to the right controller 4. The reason is as follows. In the present embodiment, the right controller 4 is provided in an area that is not reached by the hands of the user holding the grip portions of the ring-shaped extension apparatus 5. Therefore, when an operation to the right controller 4 has been performed, it is expected that the user has intentionally released the hand from the grip portion and performed the operation to the right controller 4. Therefore, in the ring guide display state, when an operation to the right controller 4 has been performed to make an instruction on the menu, it is less likely that the user has unintentionally performed the operation to the right controller 4. Therefore, in this case, the game system 1 executes a process according to an instruction caused by the first operation to the right controller 4, which allows the user to quickly make an instruction on the menu.

In the case where the first operation to the ring-shaped extension apparatus 5 is an operation intended by the user, if no change occurs on the menu image, the user may misunderstand that the operation has not been detected by the game system 1. In order to avoid such a situation, in the present embodiment, the guide image is changed from the controller guide image to the ring guide image in response to execution of the first operation. This allows the user to recognize that the operation has been detected, thereby reducing the likelihood of the user's misunderstanding.

In another embodiment, regarding operations to be performed to the ring-shaped extension apparatus 5 after an operation to the right controller 4 has been performed, the game system 1 may set different threshold values for detection of operations between an operation (e.g., first operation) for which a process according to an instruction caused by this operation will not be and an operation (e.g., second or subsequent operation) for which a process according to an instruction caused by this operation will be performed. For example, the game system 1 may set a threshold value for detecting the latter operation to be stricter (in other words, so that the operation is less easily detected) than the threshold value for detecting the former operation. Thus, the likelihood that an operation unintentionally performed by the user is detected as the latter operation can be reduced, whereby the likelihood of execution of a process not intended by the user can be reduced. Taking a push-in operation as an example, the game system 1 may set a threshold value for detecting the second or subsequent operation to be greater than a threshold value for detecting the first operation, so that the second operation is not detected unless the pushing amount in the second operation is more than that in the first operation.

In another embodiment, in the controller guide display state, the game system 1 may cause transition to the ring guide display state in response to that some operations (e.g., operations other than the upward and downward rotation operations) among a plurality of types of operations to the ring-shaped extension apparatus 5 have been performed, and may not cause transition to the ring guide display state even when other operations (e.g., upward and downward rotation operations) have been performed. Likewise, in the ring guide display state, the game system 1 may cause transition to the controller guide display state in response to that some operations (e.g., operations corresponding to instructions on the menu) among a plurality of types of operations to the right controller 4 have been performed, and may not cause transition to the controller guide display state even when other operations have been performed.

[2-5. Push-in Operation Detection Process]

Next, a process of detecting a push-in operation to the ring-shaped extension apparatus 5 by the game system 1 will be described. As described above, in the present embodiment, the game system 1 detects a push-in operation when the pushing amount to the ring-shaped extension apparatus 5 has become equal to or more than a threshold value. In the present embodiment, it is considered that the user may try to successively perform push-in operations. The case where push-in operations are successively performed is a case where, after a push-in operation has been performed, another push-in operation is performed before the ring-shaped portion 201 returns to the stationary state. For example, the following situation can be considered. That is, when an icon of a certain mini game is in the state of being selected in the menu image, the user performs a first push-in operation to perform a determination instruction, and when a confirmation window is displayed in response to the determination instruction, the user performs a second push-in operation successively to the first push-in operation. When the push-in operations are successively performed as described above, the game system 1 resets the threshold value. The process of detecting push-in operations will be described below.

Figure 15:
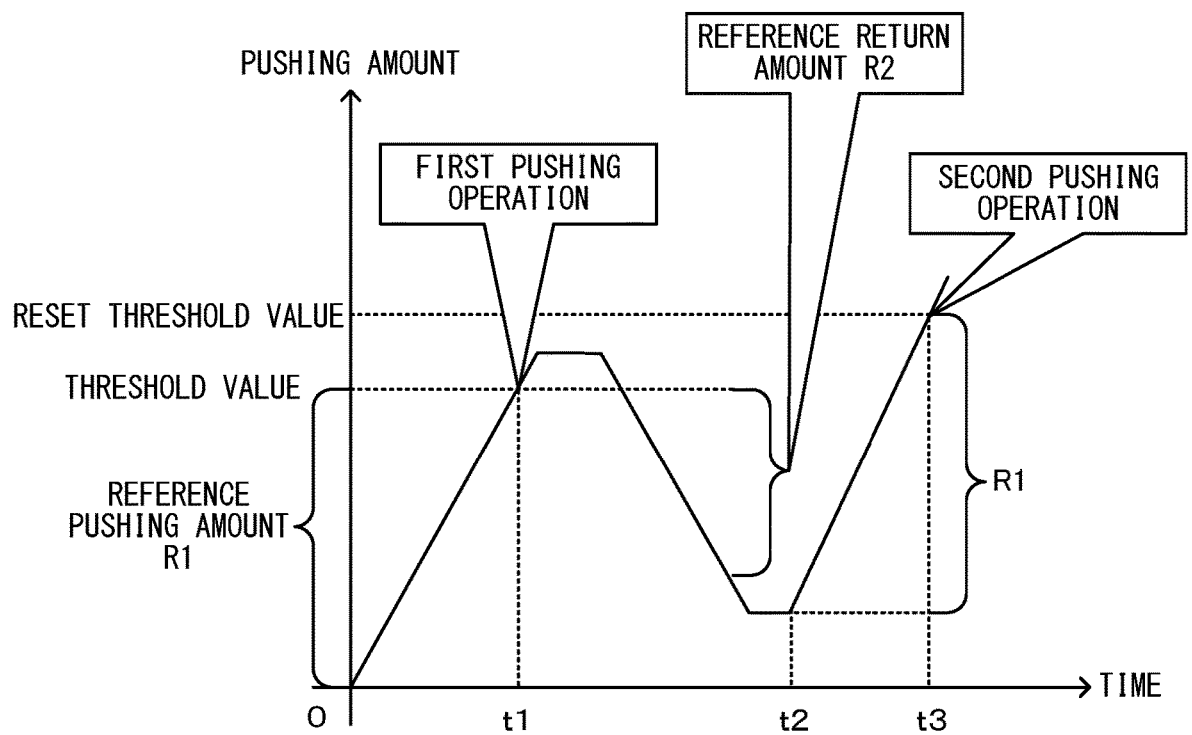
FIG. 15 is a diagram showing an example of change in a pushing amount with time in a case where two push-in operations are successively performed.

FIG. 15 shows an example of a change in the pushing amount with time when two push-in operations are successively performed. In FIG. 15, the vertical axis represents the pushing amount, and the horizontal axis represents time. In the example of FIG. 15, first, the first push-in operation is performed to the ring-shaped extension apparatus 5 in the stationary state. When the ring-shaped extension apparatus 5 is in the stationary state, the threshold value is set to a reference pushing amount R1. The reference pushing amount R1 is a constant that is defined in the game application in advance. In the example of FIG. 15, when the pushing amount has become equal to or more than the threshold value equal to the reference pushing amount R1 (time t1), the game system 1 detects that the first push-in operation has been performed. In the present embodiment, after the push-in operation has been detected, no threshold value is set (i.e., no push-in operation is detected even when the pushing amount has become equal to or more than the above threshold value) until a condition described below is satisfied and a threshold value is set again).

After the first push-in operation has been performed, the user reduces the force of pushing the ring-shaped extension apparatus 5 to restore the ring-shaped extension apparatus 5 to the stationary state. Therefore, as shown in FIG. 15, after the first push-in operation, the pushing amount decreases from the state where it has become equal to or more than the reference pushing amount R1. If the user intends to perform the second push-in operation successively to the first push-in operation, the user may start the second push-in operation in the state before the ring-shaped extension apparatus 5 returns to the stationary state. In the example of FIG. 15, it is assumed that, after the pushing amount decreased to the state equal to or less than a value obtained by subtracting a reference return amount R2 from the threshold value (here, the reference pushing amount R1), the pushing amount increased again due to the second push-in operation. The reference return amount R2 is a constant that is defined in the game application in advance. The reference return amount R2 is set to a value smaller than the reference pushing amount R1 (e.g., 75% of the reference pushing amount R1).

In the above case, if detection of the second push-in operation is performed based on the same threshold value (i.e., the threshold value equal to the reference pushing amount R1) as that used for detection of the first push-in operation, the second push-in operation will be detected with less amount of change in the pushing amount than that in the first push-in operation. At this time, since the amount of change in the pushing amount is decreased although the threshold value is actually not changed, the user feels as if the second push-in operation has been detected earlier than he/she expected, which may make the user feel discomfort with the push-in operation.

Therefore, in the present embodiment, in the case where the user intends to perform the second push-in operation successively to the first push-in operation, the game system 1 resets the threshold value. Specifically, in the case where, after the first push-in operation, the pushing amount has increased again (time t2) before the ring-shaped extension apparatus 5 returns to the stationary state, the game system 1 sets, as a reset threshold value, a value obtained by adding the reference pushing amount R1 to a minimum value (in FIG. 15, the pushing amount at time t2) of the pushing amount after the first push-in operation. Then, when the pushing amount has become equal to or more than the reset threshold value (time t3), the game system 1 detects that the second push-in operation has been performed.

As described above, in the case where the ring-shaped extension apparatus 5 deforms in the pushing direction from the stationary state, the game system 1 executes a process instructed by the push-in operation in response to deformation of the ring-shaped extension apparatus 5 to an extent equal to or more than a first deformation state (in the example of FIG. 15, the state in which the pushing amount is equal to the reference pushing amount R1) in the pushing direction from the stationary state. Meanwhile, in the case where the ring-shaped extension apparatus 5 deforms to an extent equal to or more than the first deformation state, then starts to return toward the stationary state, and thereafter deforms in the first direction from the state before returning to the stationary state (the state at time t2 in the example of FIG. 15), that is, deforms in the first direction without returning to the stationary state, the game system 1 executes a process instructed by the push-in operation in response to deformation of the ring-shaped extension apparatus 5 to an extent equal to or more than a second deformation state (in the example of FIG. 15, the state where the pushing amount is equal to the reset threshold value) in which the amount of change in the pushing direction is more than that in the first deformation state. In this case, since the second push-in operation is detected when the user has pushed the ring-shaped extension apparatus 5 inward to an extent more than that in the first push-in operation, the likelihood that the user may feel as if the push-in operation has been detected earlier than he/she expected can be reduced, thereby improving operability of the push-in operation.

In the present embodiment, the threshold value is reset to the value obtained by adding the reference pushing amount R1 to the minimum value of the pushing amount after the first push-in operation. In another embodiment, the reset threshold value may be any value that is greater than the threshold value before reset. For example, in another embodiment, the reset threshold value may be a value obtained by multiplying the threshold value before reset by a predetermined number (e.g., 1.2).

Figure 16:
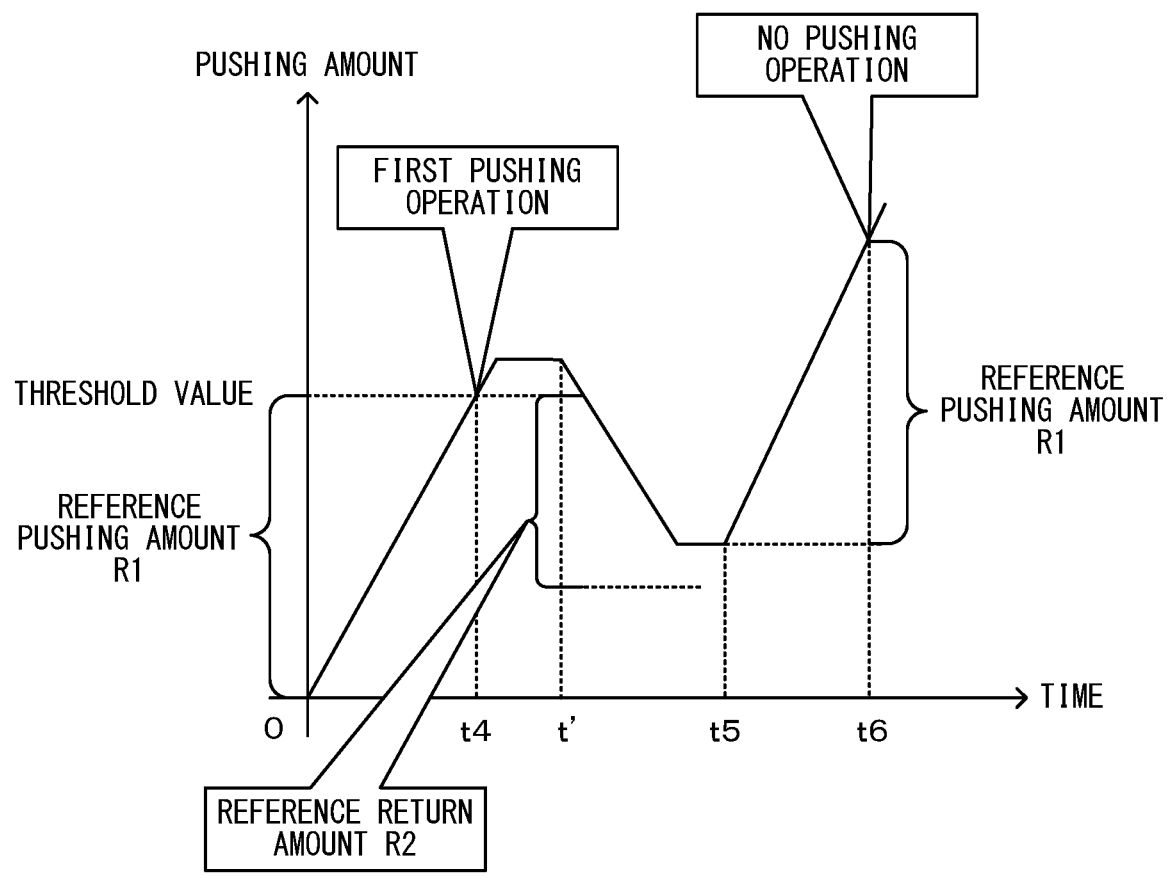
FIG. 16 is a diagram showing another example of change in a pushing amount with time.

FIG. 16 shows another example of a change in the pushing amount with time. In the example of FIG. 16, a change in the pushing amount before detection of the first push-in operation is identical to that shown in FIG. 15. In the example of FIG. 16, it is assumed that, after the first push-in operation, the pushing amount did not decrease to a state equal to or less than the value obtained by subtracting the reference return amount R2 from the reference pushing amount R1, was maintained to be more than this value (time t5), and thereafter, increased again due to the second push-in operation.

As shown in FIG. 16, in the case where, after the first push-in operation, the pushing amount has increased again in the state where the pushing amount is more than the value obtained by subtracting the reference return amount R2 from the reference pushing amount R1, the game system 1 does not set a threshold value. Therefore, even if, as shown in FIG. 16, the pushing amount has increased to be equal to or more than the value obtained by adding the reference pushing amount R1 to the minimum value of the pushing amount after the first push-in operation (time t6), the game system 1 does not detect the push-in operation.

As described above, in the case where the ring-shaped extension apparatus 5 deforms to an extent equal to or more than the first deformation state, then returns to a deformation state equal to or less than a third deformation state in which the amount of deformation in the first direction is less than that in the first deformation state, and thereafter deforms in the first direction, the game system 1 executes a process instructed by the push-in operation in response to deformation of the ring-shaped extension apparatus 5 to an extent equal to or more than the second deformation state (see FIG. 15). Meanwhile, in the case where the ring-shaped extension apparatus 5 deforms to an extent equal to or more than the first deformation state, then returns toward the stationary state without having returned to the third deformation state, and thereafter deforms in the first direction, the game system 1 does not execute a process instructed by the push-in operation even when the ring-shaped extension apparatus 5 has deformed to an extent equal to or more than the second deformation state (see FIG. 16). In the present embodiment, the third deformation state is a state where the pushing amount becomes the value obtained by subtracting the reference return amount R2 from the reference pushing amount R1. In another embodiment, the third deformation state may be a state where the pushing amount becomes equal to or less than a value obtained by subtracting the reference return amount R2 from a maximum value of the pushing amount in the first push-in operation (e.g., the pushing amount at time t' shown in FIG. 16). Thus, the third deformation state may be either the state where the amount of deformation in the pushing direction becomes a specific value or the state where the amount of deformation in the pushing direction becomes a value that depends on the pushing amount in the first push-in operation.

When the user has performed a push-in operation, it is difficult for the user to keep the pushing amount constant because a force to restore the ring-shaped extension apparatus 5 to the stationary state acts on the ring-shaped extension apparatus 5, which may cause a little increase or decrease in the pushing amount. For example, if the pushing force is a little reduced immediately after the push-in operation has been detected, the user may push the ring-shaped extension apparatus 5 again to restore the ring-shaped extension apparatus 5 to the previous pushed state. In the state where the pushing amount has been a little decreased after the push-in operation and then increased more, if the second push-in operation is detected, the detection of the second push-in operation is against the intention of the user. However, in the present embodiment, since the second push-in operation is detected on the condition that the pushing amount has been reduced to be less than the predetermined amount, the likelihood of detection of the second push-in operation against the intention of the user can be reduced.

Although not shown in the figures, when a third and subsequent push-in operations are performed successively to the second push-in operation, the game system 1 resets the threshold value in the same manner as described above. That is, when the pushing amount has increased again after the n-th (n: natural number) push-in operation was performed and before the ring-shaped extension apparatus 5 returns to the stationary state, the game system 1 provides, as a reset threshold value, a value obtained by adding the reference pushing amount R1 to the minimum value of the pushing amount after the n-th push-in operation. At this time, the game system 1 resets the threshold value on the condition that the pushing amount has been restored to be less than a value obtained by subtracting the reference return amount R2 from the present threshold value. Since the pushing amount of the ring-shaped extension apparatus 5 has an upper limit, the game system 1 provides an upper-limit value for the threshold value to be set.

When the ring-shaped extension apparatus 5 has returned to the stationary state (i.e., when the pushing amount has become 0) after the push-in operation, the game system 1 returns the threshold value to an initial value (i.e., a value equal to the reference pushing amount R1). Not only when the pushing amount has become exactly 0 but also when the pushing amount has become almost 0, the game system 1 may restore the threshold value to the initial value upon determination that the ring-shaped extension apparatus 5 has substantially returned to the stationary state.

In the present embodiment, regarding the pull operation, the game system 1 sets a fixed value as a threshold value for detecting that a pull operation has been performed, and does not perform resetting of the threshold value in contrast to the push-in operation. However, in another embodiment, in addition to (or instead of) the push-in operation, the game system 1 may perform resetting of the threshold value for the pull operation as well as the push-in operation (or instead of the push-in operation).

3. Specific Example of Information Processing in Game System

Figure 17:
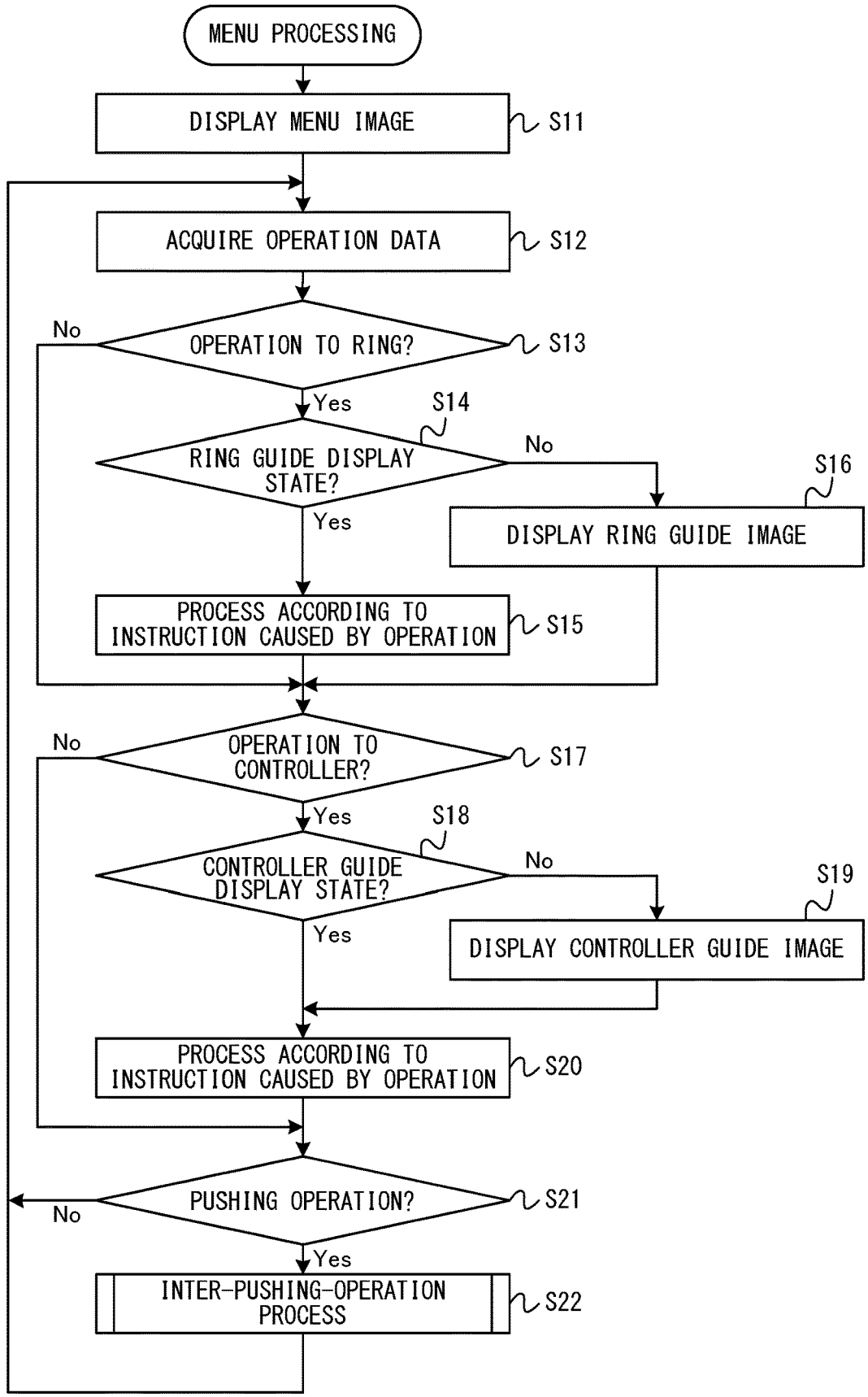
FIG. 17 is a flowchart showing an example of menu processing executed by a non-limiting game system 1.
Figure 18:
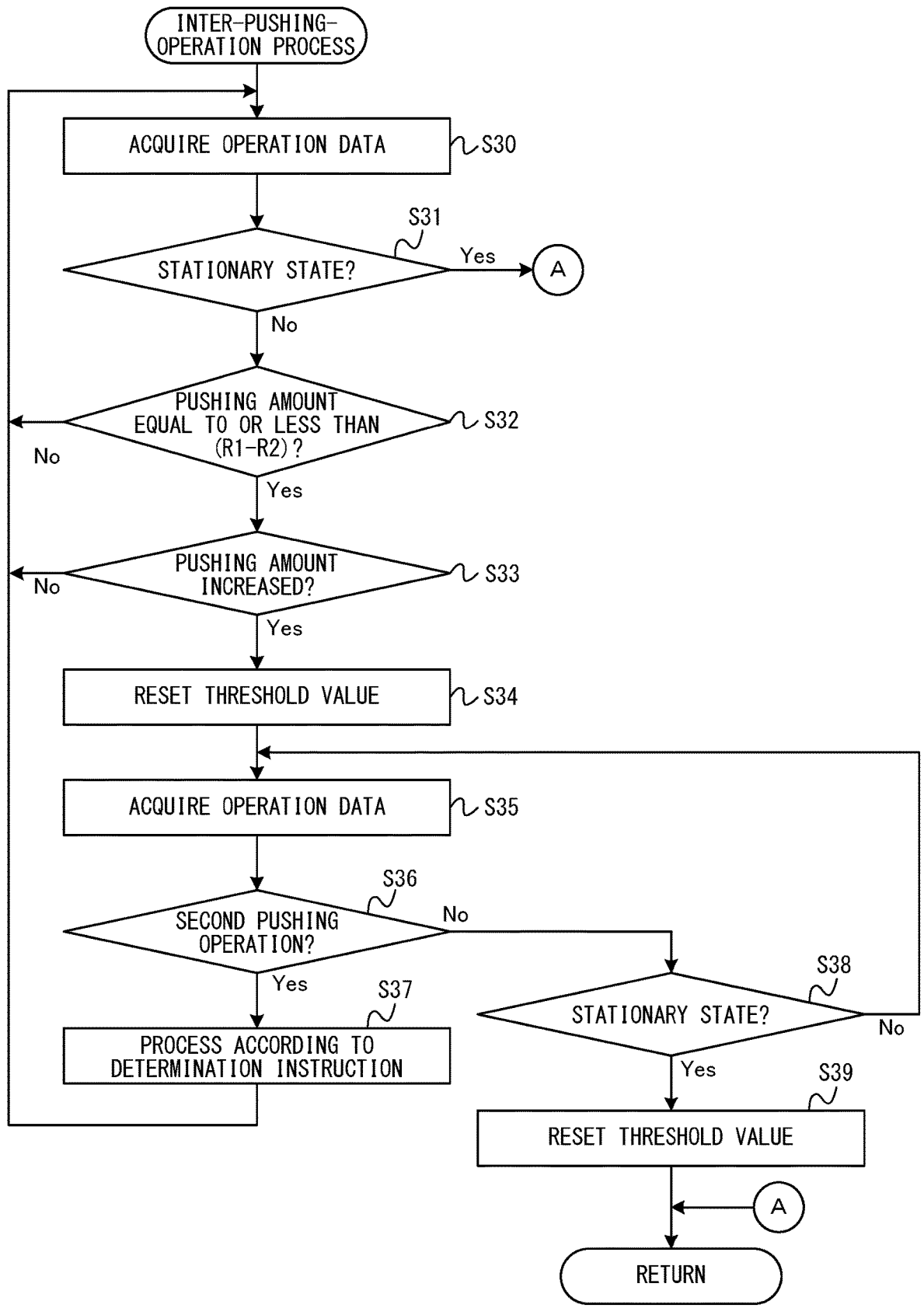
FIG. 18 is a sub-flowchart showing an example of a specific flow of an inter-pushing-operation process in step S22 shown in FIG. 17.

FIG. 17 and FIG. 18 are flowcharts illustrating an example of menu processing executed by the game system 1. The sequential menu processing shown in FIG. 17 and FIG. 18 is processing for presenting a menu to a user, accepting an instruction on the menu from the user, and executing a process according to the instruction. After execution of the program of the game application described above has been started, the menu processing is started in response to, for example, an instruction performed by a player to display the menu image described above.

In the present embodiment, it is assumed that the processor 81 of the main body apparatus 2 executes the program of the game application stored in the game system 1, thereby executing processes in steps shown in FIG. 17 and FIG. 18. However, in another embodiment, a part of the processes in the steps may be executed by a processor (e.g., a dedicated circuit or the like) other than the processor 81. When the game system 1 is communicable with another information processing apparatus (e.g., a server), a part of the processes in the steps shown in FIG. 17 and FIG. 18 may be executed by the information processing apparatus. For example, a part of a process for detecting an operation performed by a player on the basis of operation data from a controller may be executed by the controller. The processes in the steps shown in FIG. 17 and FIG. 18 are merely examples. The order of the processes in the steps may be changed, and other processes may be executed in addition to (or instead of) the processes in the steps so long as similar results can be obtained.

The processor 81 executes the processes in the steps shown in FIG. 17 and FIG. 18 by using a memory (e.g., a DRAM 85). That is, the processor 81 stores, in the memory, information (in other words, data) obtained in each process step, and reads out the information from the memory when using the information for the subsequent process steps.

In the menu processing, first, in step S11, the processor 81 causes the display device to display a menu image. The modes of initial display of tabs, cursors, and guide images are optional. When display of the menu image is started, the tabs and the cursors are displayed such that, for example, an item defined in the game application in advance is set in the state of being selected. In addition, when display of the menu image is started, for example, a ring guide image is displayed as a guide image. Next to step S11, the process in step S12 is executed.

In step S12, the processor 81 acquires operation data from the controller. Specifically, the processor 81 receives the ring operation data and the right controller operation data transmitted from the right controller 4 via the controller communication section 83 to obtain these operation data. Next to step S12, the process in step S13 is executed.

In step S13, the processor 81 determines whether or not an operation, to the ring-shaped extension apparatus 5, for performing an instruction on the menu has been performed. That is, based on the operation data acquired in step S12, the processor 81 determines whether or not a rotation operation, a push-in operation, or a pull operation has been detected. Whether or not a rotation operation has been detected can be determined based on a detection result of the acceleration sensor 114 (or the angular velocity sensor 115) included in the right controller operation data. Whether or not a push-in operation or a pull operation has been detected can be determined based on information that is included in the ring operation data and indicates a strain value detected by the distortion detection portion 211. When the determination result in step S13 is positive, the process in step S14 is executed. When the determination result in step S13 is negative, the process in step S17 described below is executed.

In step S14, the processor 81 determines whether or not the menu image display state is the ring guide display state described above (see FIG. 11). When the determination result in step S14 is positive, the process in step S15 is executed. When the determination result in step S14 is negative, the process in step S16 described below is executed.

In step S15, the processor 81 executes a process according to an instruction caused by the operation detected in step S13. Specifically, when a rotation operation has been detected, the processor 81 executes a process according to a switching instruction. When a push-in operation has been detected, the processor 81 executes a process according to a determination instruction. When a pull operation has been detected, the processor 81 executes a process according to a cancel instruction. Next to step S15, the process in step S17 described below is executed.

Meanwhile, in step S16, the processor 81 causes the display device to display the menu image including the ring guide image. That is, the processor 81 switched the guide image in the menu image from the controller guide image (see FIG. 13) to the ring guide image (see FIG. 11). Next to step S16, the process in step S17 is executed.

As described above, in the present embodiment, when the determination result in step S14 is negative and thereby the process in step S16 is executed, the process in step S15 is not executed. Therefore, in the present embodiment, as described above, when an operation to the ring-shaped extension apparatus 5 has been performed in the controller guide display state, an instruction on the menu according to this operation is not accepted, and therefore, a process according to this instruction is not executed.

In step S17, the processor 81 determines whether or not an operation, to the right controller 4, for performing an instruction on the menu has been performed. That is, based on the operation data acquired in step S12, the processor 81 determines whether or not an operation to the analog stick 52, the A-button 53, or the X-button 55 of the right controller 4 has been detected. When the determination result in step S17 is positive, the process in step S18 is executed. When the determination result in step S17 is negative, the process in step S21 described later is executed.

In step S18, the processor 81 determines whether or not the menu image display state is the controller guide display state described above (see FIG. 13). When the determination result in step S18 is positive, the process in step S19 is skipped, and the process in step S20 described later is executed. When the determination result in step S18 is negative, the process in step S19 is executed.

In step S19, the processor 81 causes the display device to display the menu image including the controller guide image. That is, the processor 81 switches the guide image in the menu image from the ring guide image (see FIG. 11) to the controller guide image (see FIG. 13). Next to step S19, the process in step S20 is executed.

In step S20, the processor 81 executes a process according to an instruction caused by the operation detected in step S17. Specifically, when an operation to the analog stick 52 has been detected, the processor 81 executes a process according to a switching instruction. When an operation to the X-button 55 has been detected, the processor 81 executes a process according to a determination instruction. When an operation to the A-button 53 has been detected, the processor 81 executes a process according to a cancel instruction. Next to step S20, the process in step S21 is executed.

As described above, in the present embodiment, even when the determination result in step S18 is negative and thereby the process in step S19 is executed, the process in step S20 is executed. Therefore, in the present embodiment, as described above, when an operation to the right controller 4 has been performed in the ring guide display state, an instruction on the menu according to this operation is accepted, and a process according to this instruction is executed.

In step S21, the processor 81 determines whether or not the operation detected in step S13 is a push-in operation. When the determination result in step S21 is positive, the process in step S22 is executed. When the determination result in step S21 is negative, the process in step S12 is executed again. In this case, the series of processes in steps S11 to S22 are repeatedly executed until display of the menu image is ended by the process in step S16 or step S20 (e.g., until another menu image different from this menu image is displayed, or until a game is started and a game image is displayed).

In step S22, the processor 81 executes an inter-pushing-operation process. The inter-pushing-operation process is a process of resetting a threshold value after a first push-in operation has been performed to the ring-shaped extension apparatus 5, and detecting second and subsequent push-in operations. Hereinafter, the inter-pushing-operation process will be described in detail with reference to FIG. 18.

FIG. 18 is a sub-flowchart showing an example of a specific flow of the inter-pushing-operation process in step S22 shown in FIG. 17. In the inter-pushing-operation process, first, the processor 81 acquires operation data from the controller in step S30. The process in step S30 is identical to the process in step S12. Next to step S30, the process in step S31 is executed.

In step S31, the processor 81 determines whether or not the ring-shaped extension apparatus 5 is in the stationary state (i.e., whether or not the ring-shaped extension apparatus 5 has returned to the stationary state from the state where the push-in operation was performed thereto). The pushing amount after the push-in operation to the ring-shaped extension apparatus 5 can be calculated based on information that is included in the ring operation data and indicates the strain value detected by the distortion detection portion 211. The processor 81 can perform the determination in step S31 based on whether or not the pushing amount has become 0. When the determination result in step S31 is positive, the processor 81 ends the inter-pushing-operation process. When the determination result in step S31 is negative, the process in step S32 is executed.

In step S32, the processor 81 determines whether or not the pushing amount after the push-in operation to the ring-shaped extension apparatus 5 has become equal to or less than a value obtained by subtracting the reference return amount R2 from the reference pushing amount R1. When the determination result in step S32 is positive, the process in step S33 is executed. When the determination result in step S32 is negative, the process in step S30 is executed again.

In step S33, the processor 81 determines whether or not the pushing amount has changed in the increase direction. This determination can be performed based on, for example, whether or not the pushing amount calculated based on the most recently acquired operation data is more than the pushing amount calculated based on the previously acquired operation data. When the determination result in step S33 is positive, the process in step S34 is executed. When the determination result in step S33 is negative, the process in step S30 is executed again.

In step S34, the processor 81 resets the threshold value for detecting a push-in operation. The processor 81 calculates a reset threshold value according to the method described in the above "[2-5. Push-in operation detection process]". Next to the step S34, the process in step S35 is executed.

As described above, in the present embodiment, after a push-in operation has been detected, the threshold value is not reset and determination as to whether or not a push-in operation has been performed (step S36 described below) is not executed until both the determination results in step S32 and step S33 become positive. Therefore, in the present embodiment, in the case where the ring-shaped extension apparatus 5 does not return toward the stationary state by a predetermined amount or more from the state where the push-in operation has been performed to the ring-shaped extension apparatus 5 (see FIG. 16), the push-in operation is not detected, and a process according to an instruction caused by the push-in operation is not executed.

In step S35, the processor 81 acquires operation data from the controller. The process in step S35 is identical to the process in step S12 or step S30. Next to step S35, the process in step S36 is executed.

In step S36, the processor 81 determines whether or not a further (i.e., a second or subsequent) push-in operation has been performed. Specifically, the processor 81 determines whether or not the pushing amount has become equal to or more than the threshold value reset in the process of step S34. When the determination result in step S36 is positive, the process in step S37 is executed. When the determination result in step S36 is negative, the process in step S38 is executed.

In step S37, the processor 81 executes a process according to a determination instruction caused by the push-in operation. Next to the step S37, the process in step S30 is executed again. However, when the execution of the process according to the determination instruction in step S37 causes display of the menu image to be ended (e.g., when a game is started and a game image is displayed), the processor 81 ends the menu processing.

Meanwhile, in step S38, the processor 81 determines whether or not the ring-shaped extension apparatus 5 is in the stationary state. The process in step S38 is identical to the process in step S31. When the determination result in step S38 is positive, the process in step S39 is executed. When the determination result in step S38 is negative, the process in step S35 is executed again.

In step S39, the processor 81 resets the reset threshold value. That is, the threshold value for detecting a push-in operation is restored to the initial value. After step S39, the processor 81 ends the inter-pushing-operation process.

4. Function and Effect of Present Embodiment, and Modifications

In the above embodiment, the information processing system (i.e., the game system 1) is provided with: a training tool (i.e., the ring-shaped extension apparatus 5 to which the right controller 4 is attached) which includes a sensor (i.e., a strain gauge) and is configured to be held by a user; and a processor (i.e., the main body apparatus 2) integral with or separate from the training tool. The training tool is configured to be in a stationary state when no force is externally applied thereto, and deform from the stationary state when a force is externally applied thereto. The sensor outputs according to deformation of the training tool. The processor is configured to (1) receive sensor information (i.e., ring operation data) based on an output of the sensor, (2) present a menu that accepts an instruction of the user, and (3) while the menu is presented, execute a process according to a first instruction (e.g., a determination instruction) performed on the menu in a case where the received sensor information indicates an output obtained when the training tool deforms in a first direction (e.g., a pushing direction), and execute a process according to a second instruction (e.g., a cancel instruction) that is performed on the menu and is different from the first instruction, in a case where the received sensor information indicates an output obtained when the training tool deforms in a second direction (e.g., a pulling direction) opposite to the first direction.

The "sensor information based on the output of the sensor" may be information indicating an output value of the sensor, or information indicating a result of any processing performed on the output value of the sensor. For example, in the above embodiment, as the "sensor information based on the output of the sensor", the main body apparatus 2 receives ring operation data including information indicating a strain value detected by the distortion detection portion 211. However, in another embodiment, any value (e.g., a value indicating the amount of deformation of the ring-shaped extension apparatus 5) may be calculated based on the strain value in the ring-shaped extension apparatus 5 or the right controller 4, and information indicating the calculated value may be transmitted from the right controller 4 and received by the main body apparatus 2.

According to the above configuration, the user is allowed to perform two types of instructions on the menu through the operation to deform the training tool. Thus, when the menu is presented, the user is allowed to perform the instructions on the menu while holding the training tool. Thus, the information processing system can save the user from the trouble of switching the training tool for another device to perform an instruction on the menu, thereby improving convenience of the user in using the training tool.

In the above embodiment, the case has been described in which the ring-shaped extension apparatus 5 to which the right controller 4 is attached is used as a training tool. In another embodiment, the training tool is not limited to a tool composed of a plurality of devices, and may be a single device. For example, in another embodiment, the ring-shaped extension apparatus 5 may have a communication function with the main body apparatus 2. In this case, the ring-shaped extension apparatus 5 may be singly used as a training tool.

In the above embodiment, the case has been described in which the training tool and the processor are separate from each other. However, the training tool and the processor may be integrated with each other. For example, in another embodiment, the ring-shaped extension apparatus 5 may be configured to execute the menu processing shown in FIG. 17 and FIG. 18, and may be provided with a display device for displaying a menu image. When the information processing system is implemented as a single ring-shaped extension apparatus 5, the ring-shaped extension apparatus 5 may not have a communication function with the main body apparatus 2. Also, in this case, the ring-shaped extension apparatus 5 may further have the function of the operation section of the right controller 4.

In the above embodiment, as an operation to the training tool to perform an instruction on the menu, the game system 1 detects an operation to move the training tool (specifically, a rotation operation) in addition to operations to deform the training tool (specifically, a push-in operation and a pull operation), and executes a process according to the instruction caused by the operation. In another embodiment, the game system 1 may not accept the operation to move the training tool, and may not execute the process according to the instruction caused by the operation.

The object of the above embodiment is, for example, to improve convenience of the user in using a training tool, and the above embodiment is applicable to, for example, an information processing system and the like for performing an instruction on a menu by using the training tool.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a training tool which includes a first sensor and is configured to be held by a user, and one or more processors integral with or separate from the training tool, wherein
the training tool is configured to be in a stationary state when no force is externally applied thereto, and deform from the stationary state when a force is externally applied thereto,
the first sensor is configured to output according to deformation of the training tool, and
the one or more processors are configured to:
(1) receive first sensor information based on an output of the first sensor;
(2) present a menu that accepts an instruction of the user; and
(3) while the menu is presented, execute a process according to a first instruction performed on the menu, in a case where the received first sensor information indicates an output obtained when the training tool deforms in a first direction, and execute a process according to a second instruction that is performed on the menu and is different from the first instruction, in a case where the received first sensor information indicates an output obtained when the training tool deforms in a second direction opposite to the first direction.

2. The information processing system according to claim 1, wherein
the training tool includes two grip portions to be held by hands of the user,
the first direction is a direction in which the two grip portions approach each other, and
the second direction is a direction in which the two grip portions are away from each other.

3. The information processing system according to claim 1, wherein
when the training tool deforms in the first direction, the output of the first sensor is increased as compared to the output when the training tool is in the stationary state, and
when the training tool deforms in the second direction, the output of the first sensor is decreased as compared to the output when the training tool is in the stationary state.

4. The information processing system according to claim 1, wherein
the first direction is a direction in which a first portion and a second portion of the training tool approach each other, the first portion being on an opposite side to the second portion with respect to a predetermined portion of the training tool, and
the second direction is a direction in which the first portion and the second portion are away from each other.

5. The information processing system according to claim 1, wherein
the training tool includes two grip portions to be held by hands of the user,
the training tool includes an operation device configured to accept an operation different from an operation to deform the training tool,
the one or more processors are configured to:
receive operation information based on an output of the operation device;
execute a process according to the first instruction performed on the menu, in a case where the received operation information indicates an output obtained when a first operation has been performed to the operation device; and
execute a process according to the second instruction performed on the menu, in a case where the received operation information indicates an output obtained when a second operation different from the first operation has been performed to the operation device, and
the operation device is in an area that is not or less likely to be reached by the hands of the user when the user is holding the two grip portions of the training tool in the stationary state.

6. The information processing system according to claim 5, wherein the area is at a distance of 7 cm or more from each of the two grip portions.

7. The information processing system according to claim 1, wherein
the training tool has a shape of a circular ring,
the training tool includes an attachment member to which a controller is attachable,
the controller includes an operation device configured to accept an operation different from an operation to deform the training tool,
the one or more processors are configured to:
receive operation information based on an output of the operation device;
execute a process according to the first instruction performed on the menu, in a case where the received operation information indicates an output obtained when a first operation has been performed to the operation device; and
execute a process according to the second instruction performed on the menu, in a case where the received operation information indicates an output obtained when a second operation different from the first operation has been performed to the operation device, and
the circular ring is formed such that the operation device included in the controller attached to the attachment member is in an area that is not or less likely to be reached by hands of the user when the user is holding a first portion with one hand and holding a second portion with the other hand, wherein the first portion and the second portion are two portions at which the circular ring intersects with a straight line which is orthogonal to a straight line connecting a center of the attachment member and a center of the circular ring of the training tool at the center of the circular ring.

8. The information processing system according to claim 7, wherein the area is located at a distance of 7 cm or more from each of the first portion and the second portion.

9. The information processing system according to claim 5, wherein
in a state where an instruction caused by an operation to deform the training tool has been previously accepted during presentation of the menu, if operation information is received while the menu is presented, the operation information indicating an output obtained when an operation corresponding to an instruction on the menu has been performed to the operation device, the one or more processors execute a process according to the instruction caused by the operation to the operation device; and
in a state where an instruction caused by an operation to the operation device has been previously accepted during presentation of the menu, if first sensor information is received first, the first sensor information indicating an output obtained when an operation corresponding to an instruction on the menu has been performed to deform the training tool, the one or more processors do not execute a process according to the instruction caused by the operation, and if the first sensor information indicating the output is further received, the one or more processors execute the process according to the instruction caused by the operation.

10. The information processing system according to claim 9, wherein
the information processing system includes a display device, and
the one or more processors are configured to:
cause the display device to selectively display one of a first guide image representing an operation to deform the training tool and a second guide image representing an operation to the operation device;
cause the display device to display the first guide image, in a case where the first sensor information received while the menu is presented indicates that an operation corresponding to an instruction on the menu has been performed to deform the training tool; and
cause the display device to display the second guide image, in a case where the operation information received while the menu is presented indicates that an operation corresponding to an instruction on the menu has been performed to the operation device.

11. The information processing system according to claim 7, wherein
in a state where an instruction caused by an operation to deform the training tool has been previously accepted during presentation of the menu, if operation information is received while the menu is presented, the operation information indicating an output obtained when an operation corresponding to an instruction on the menu has been performed to the operation device, the one or more processors execute a process according to the instruction caused by the operation to the operation device;
in a state where an instruction caused by an operation to the operation device has been previously accepted during presentation of the menu, if first sensor information is received first, the first sensor information indicating an output obtained when an operation corresponding to an instruction on the menu has been performed to deform the training tool, the one or more processors do not execute a process according to the instruction caused by the operation, and if the first sensor information indicating the output is further received, the one or more processors execute the process according to the instruction caused by the operation.

12. The information processing system according to claim 11, wherein
the information processing system includes a display device, and
the one or more processors are configured to:
cause the display device to selectively display one of a first guide image representing an operation to deform the training tool and a second guide image representing an operation to the operation device;
cause the display device to display the first guide image, in a case where the first sensor information received while the menu is presented indicates that an operation corresponding to an instruction on the menu has been performed to deform the training tool; and
cause the display device to display the second guide image, in a case where the operation information received while the menu is presented indicates that an operation corresponding to an instruction on the menu has been performed to the operation device.

13. The information processing system according to claim 1, wherein the one or more processors are configured to execute, as the process according to the second instruction, a process of restoring a result of the process executed according to the first instruction.

14. The information processing system according to claim 1, further comprising a second sensor configured to detect a motion of the training tool, wherein
the menu includes a plurality of items each being selectable by the user, and
the one or more processors are configured to receive second sensor information based on an output of the second sensor, and execute a process of selecting one item from among the plurality of items, based on the received second sensor information.

15. The information processing system according to claim 14, wherein
the second sensor is an acceleration sensor, and
the one or more processors are configured to change an item in a state being selected among the plurality of items, in response to an operation of rotating the training tool about an axis not parallel to a direction of gravity.

16. The information processing system according to claim 14, wherein
a process on an item being selected among the plurality of items is executed according to the first instruction, and
the one or more processors are configured not to execute the process based on the output of the second sensor or configured to reduce responsivity of the process as compared to that in the case where the training tool is in the stationary state, during a predetermined period included in a period in which the training tool is being deformed in the first direction.

17. The information processing system according to claim 1, wherein
in a case where the training tool deforms in the first direction from the stationary state, the one or more processors execute a process instructed by the first instruction, in response to deformation of the training tool to an extent equal to or more than a first deformation state in which the training tool has deformed in the first direction from the stationary state; and
in a case where the training tool deforms to an extent equal to or more than the first deformation state, then starts to return toward the stationary state, and thereafter deforms in the first direction without returning to the stationary state, the one or more processors execute the process instructed by the first instruction, in response to deformation of the training tool to an extent equal to or more than a second deformation state in which an amount of deformation in the first direction is more than that in the first deformation state.

18. The information processing system according to claim 17, wherein
in a case where the training tool deforms to an extent equal to or more than the first deformation state, then returns to a state of deformation equal to or less than a third deformation state in which an amount of deformation in the first direction is less than that in the first deformation state, and thereafter deforms in the first direction, the one or more processors execute the process instructed by the first instruction, in response to deformation of the training tool to an extent equal to or more than the second deformation state; and in a case where the training tool deforms to an extent equal to or more than the first deformation state, then returns toward the stationary state without having returned to the third deformation state, and thereafter deforms in the first direction, the one or more processors do not execute the process instructed by the first instruction even if the training tool deforms to an extent equal to or more than the second deformation state.

19. An information processing apparatus which includes a first sensor and is integral with or separate from a training tool to be held by a user, wherein
    the training tool is configured to be in a stationary state when no force is externally applied thereto, and deform from the stationary state when a force is externally applied thereto,
    the first sensor is configured to output according to deformation of the training tool, and
    the information processing apparatus is configured to:
    (1) receive first sensor information based on an output of the first sensor;
    (2) present a menu that accepts an instruction of the user; and
    (3) while the menu is presented, execute a process according to a first instruction performed on the menu, in a case where the received first sensor information indicates an output obtained when the training tool deforms in a first direction, and execute a process according to a second instruction that is performed on the menu and is different from the first instruction, in a case where the received first sensor information indicates an output obtained when the training tool deforms in a second direction opposite to the first direction.

20. A non-transitory computer-readable storage medium having stored therein an information processing program executed by a processor of an information processing apparatus which includes a first sensor and is integral with or separate from a training tool to be held by a user, wherein
    the training tool is configured to be in a stationary state when no force is externally applied thereto, and deform from the stationary state when a force is externally applied thereto,
    the first sensor is configured to output according to deformation of the training tool, and
    the information processing program causes the processor to execute:
    receiving first sensor information based on an output of the first sensor;
    presenting a menu that accepts an instruction of the user; and
    while the menu is presented, executing a process according to a first instruction performed on the menu, in a case where the received first sensor information indicates an output obtained when the training tool deforms in a first direction, and executing a process according to a second instruction that is performed on the menu and is different from the first instruction, in a case where the received first sensor information indicates an output obtained when the training tool deforms in a second direction opposite to the first direction.

21. An information processing method executed in an information processing system comprising a training tool which has a first sensor and is configured to be held by a user, and one more processors integral with or separate from the training tool, wherein
    the training tool is configured to be in a stationary state when no force is externally applied thereto, and deform from the stationary state when a force is externally applied thereto,
    the first sensor is configured to output according to deformation of the training tool, and
    the one or more processors
    (1) receive first sensor information based on an output of the first sensor,
    (2) present a menu that accepts an instruction of the user, and
    (3) while the menu is presented, executes a process according to a first instruction performed on the menu, in a case where the received first sensor information indicates an output obtained when the training tool deforms in a first direction, and executes a process according to a second instruction that is performed on the menu and is different from the first instruction, in a case where the received first sensor information indicates an output obtained when the training tool deforms in a second direction opposite to the first direction.

* * * * *